March 21, 1961 G. C. ELLERBECK 2,975,968
CALCULATING MACHINE
Filed July 10, 1956 10 Sheets-Sheet 1
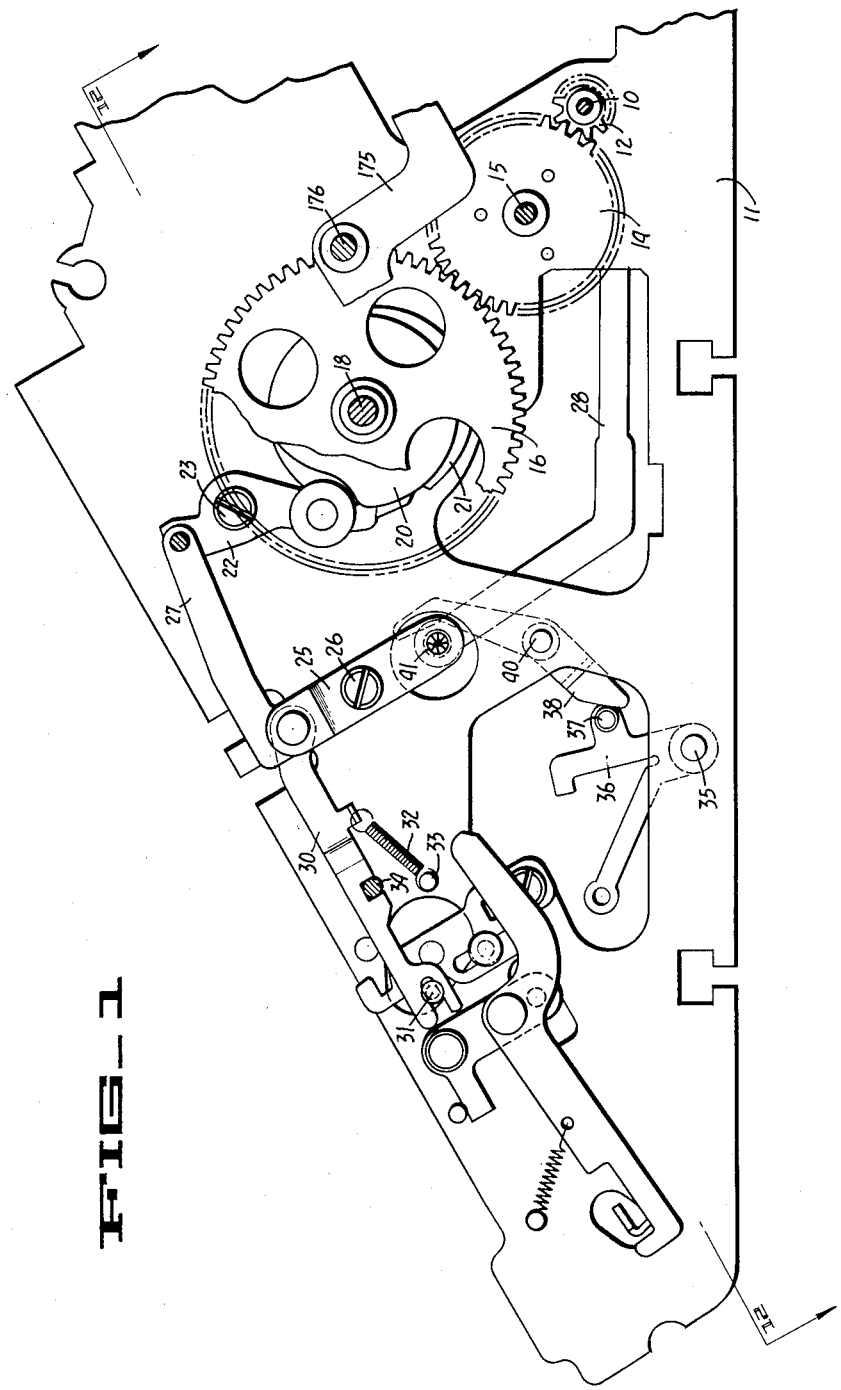
FIG_1

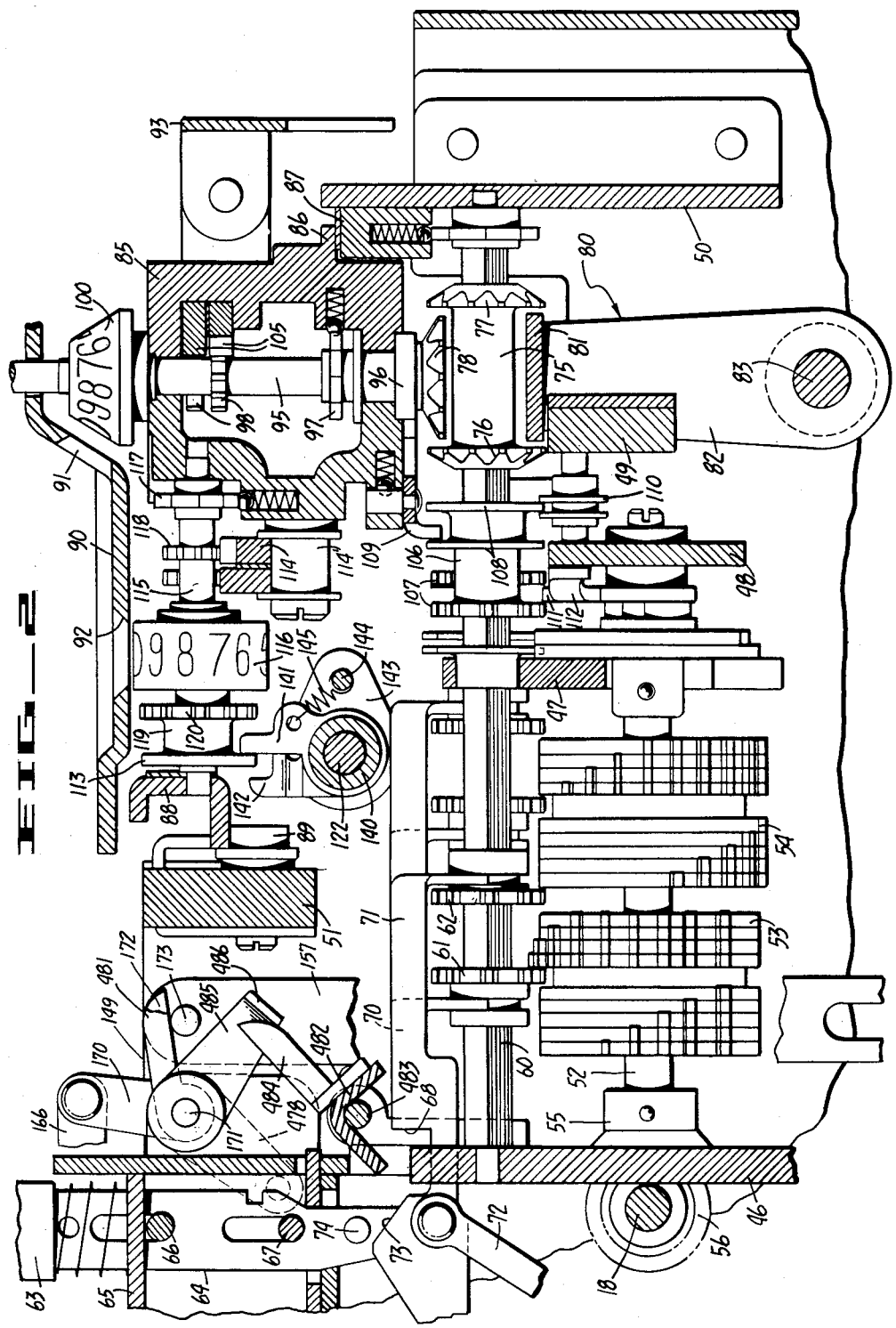

March 21, 1961 G. C. ELLERBECK 2,975,968
CALCULATING MACHINE
Filed July 10, 1956 10 Sheets—Sheet 3
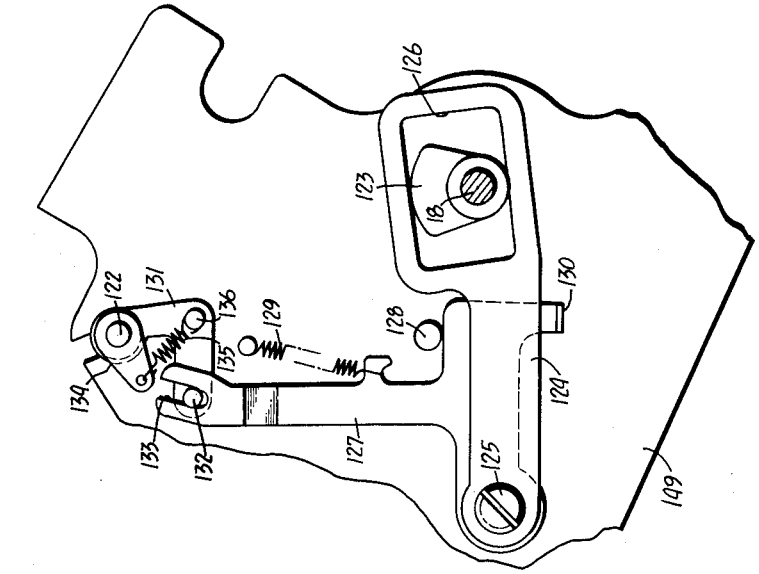
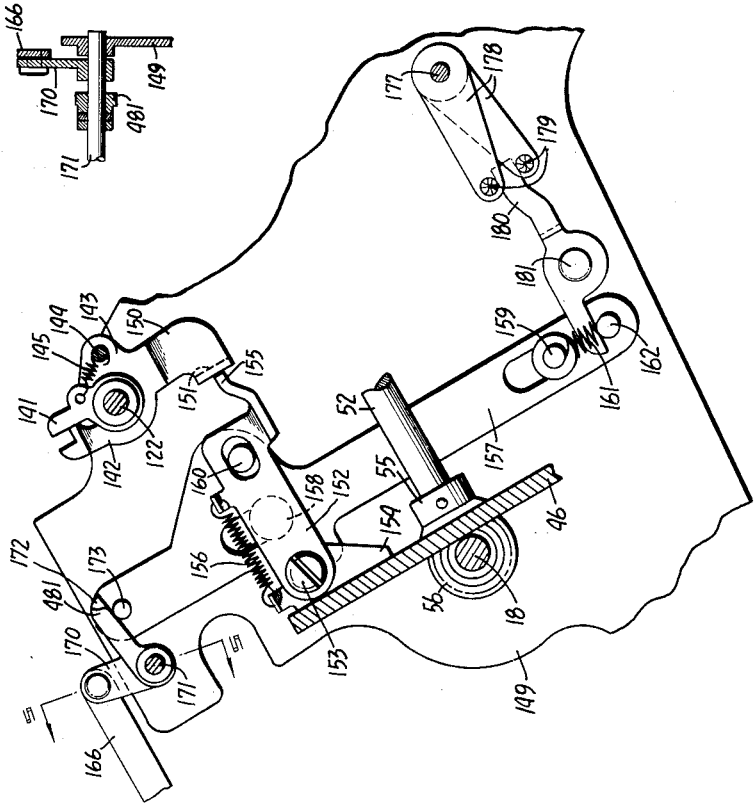

March 21, 1961  G. C. ELLERBECK  2,975,968
CALCULATING MACHINE
Filed July 10, 1956  10 Sheets-Sheet 4
FIG_8
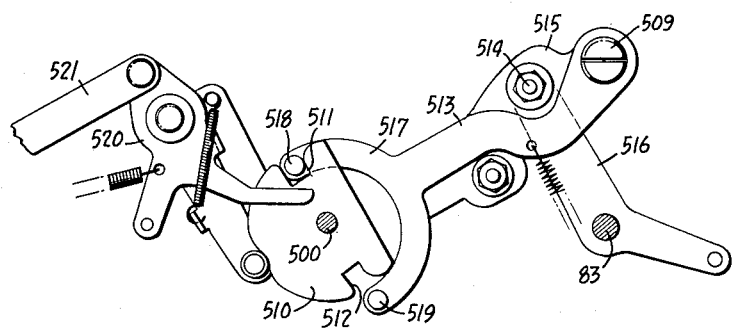
FIG_6
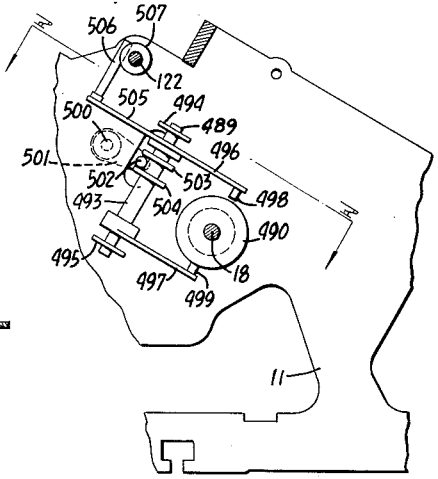
FIG_7
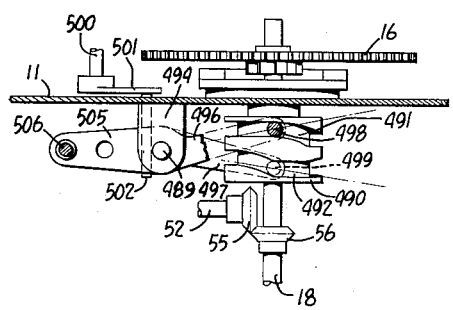

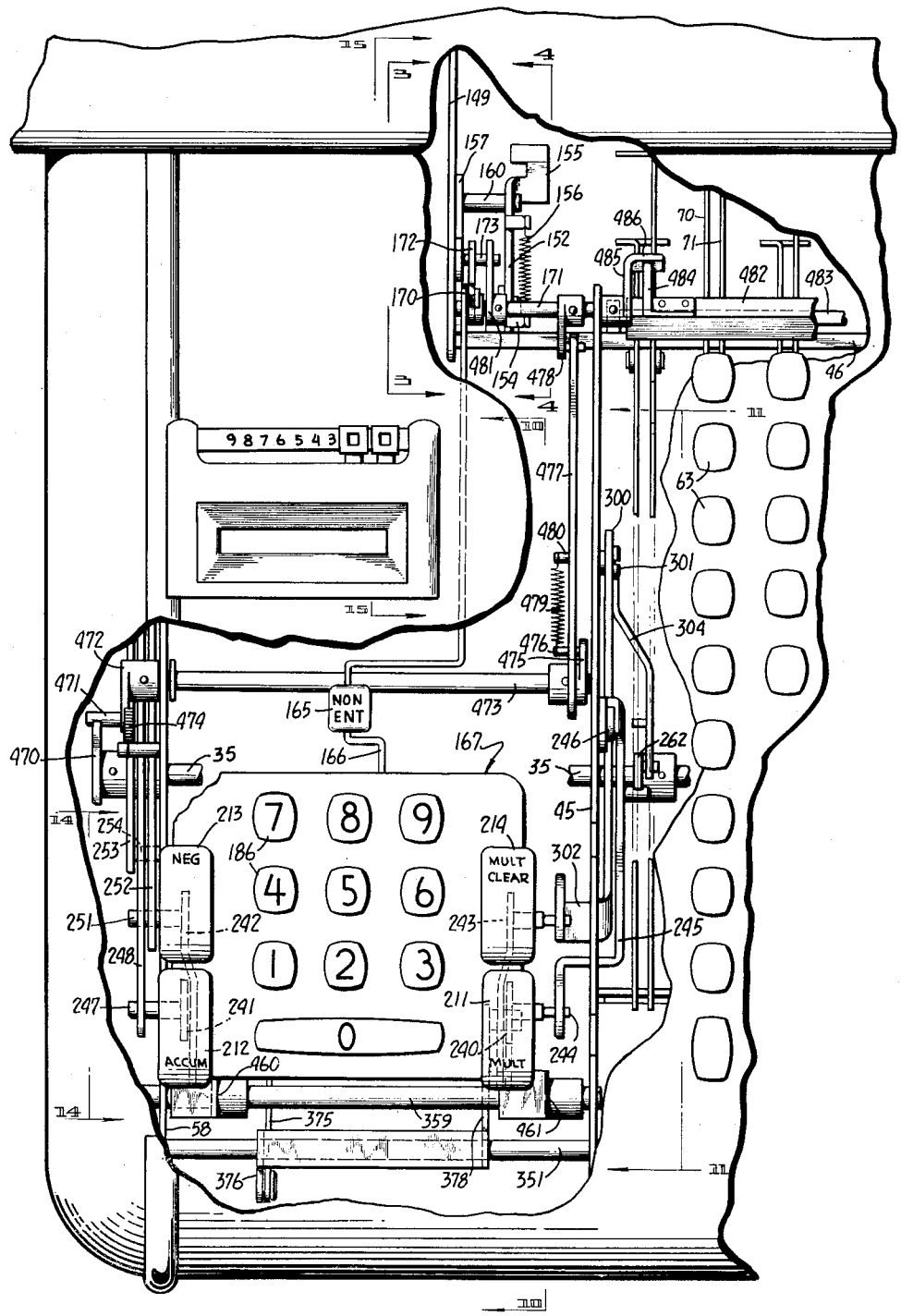

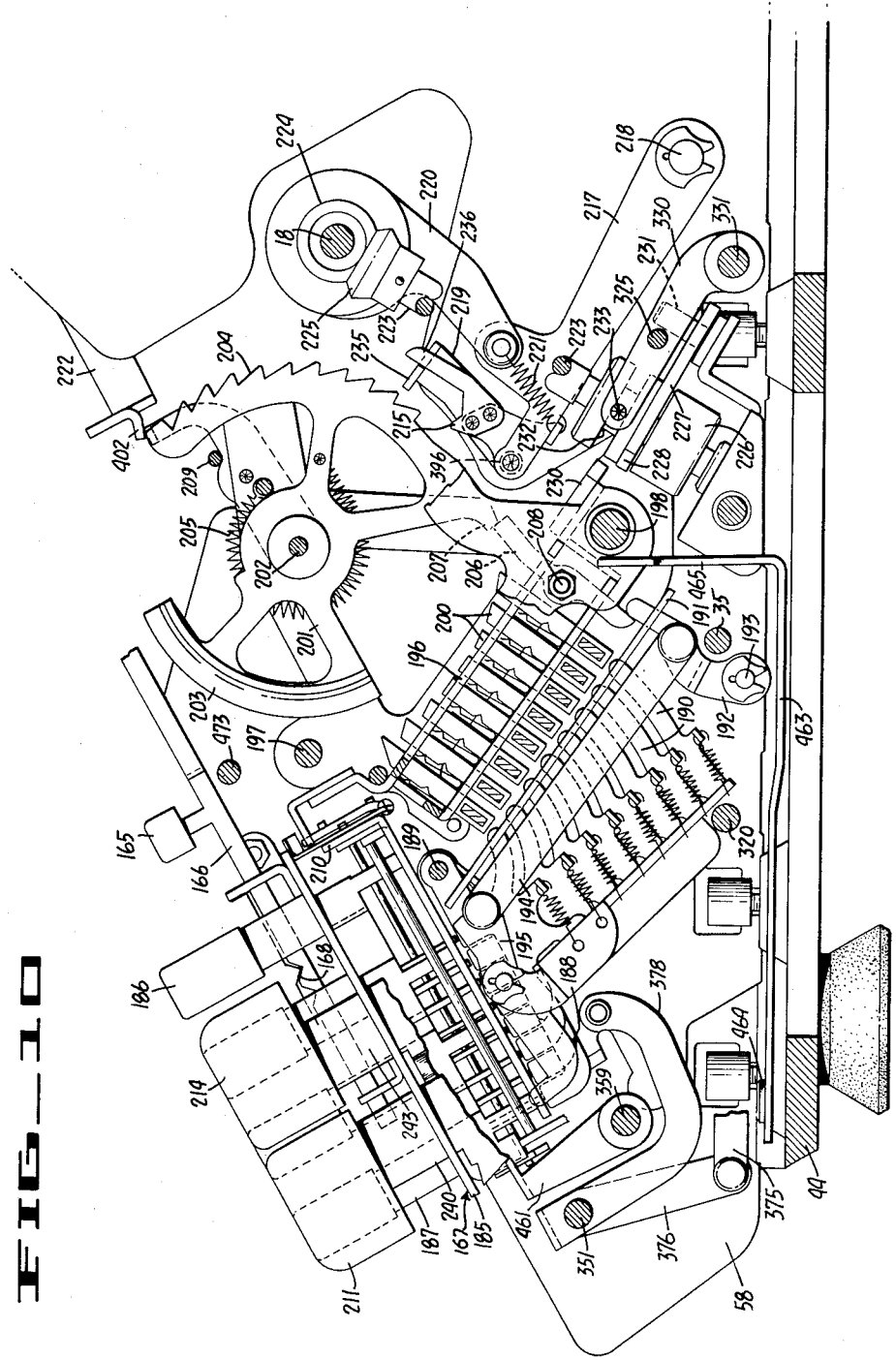
FIG_10

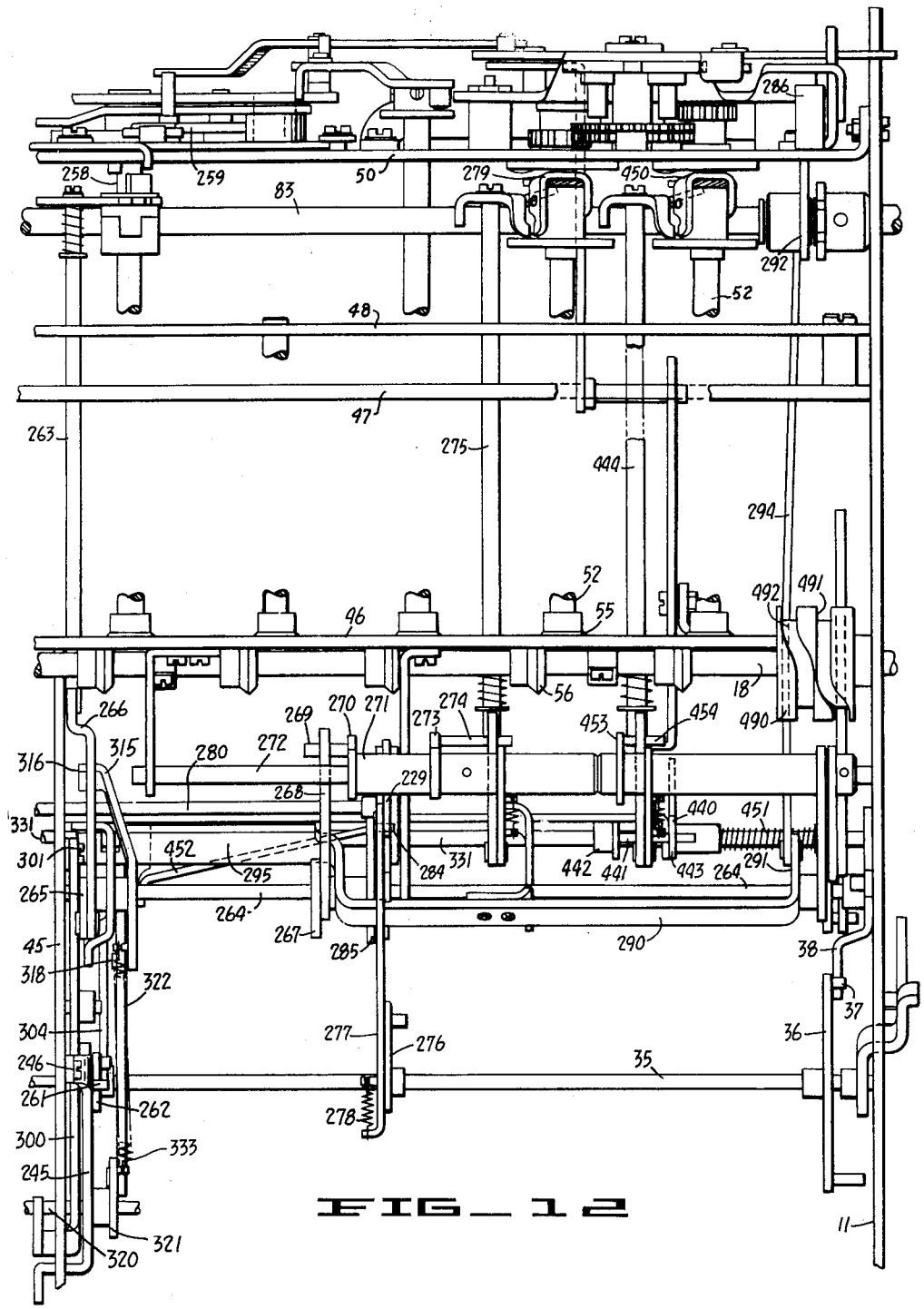
FIG_12

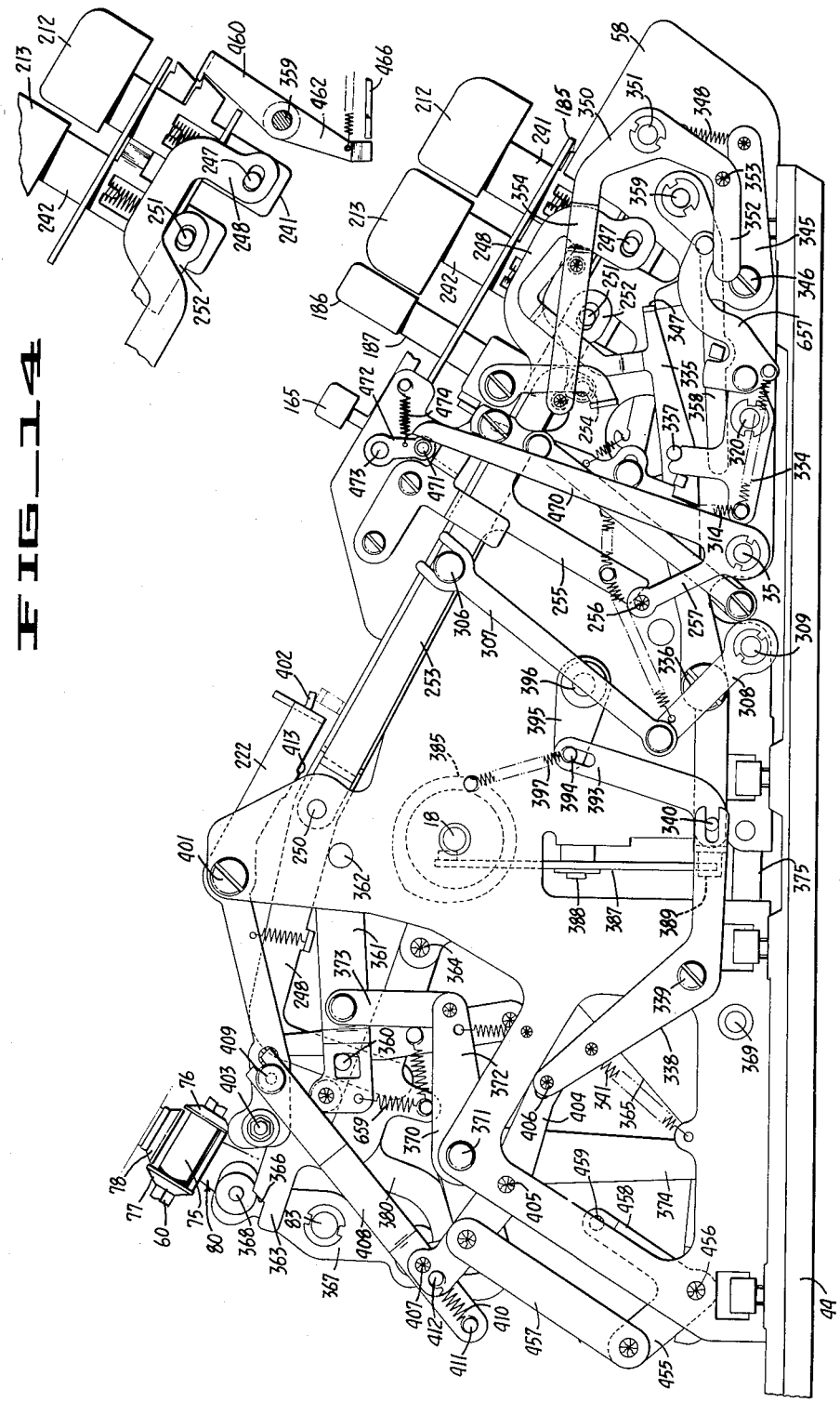

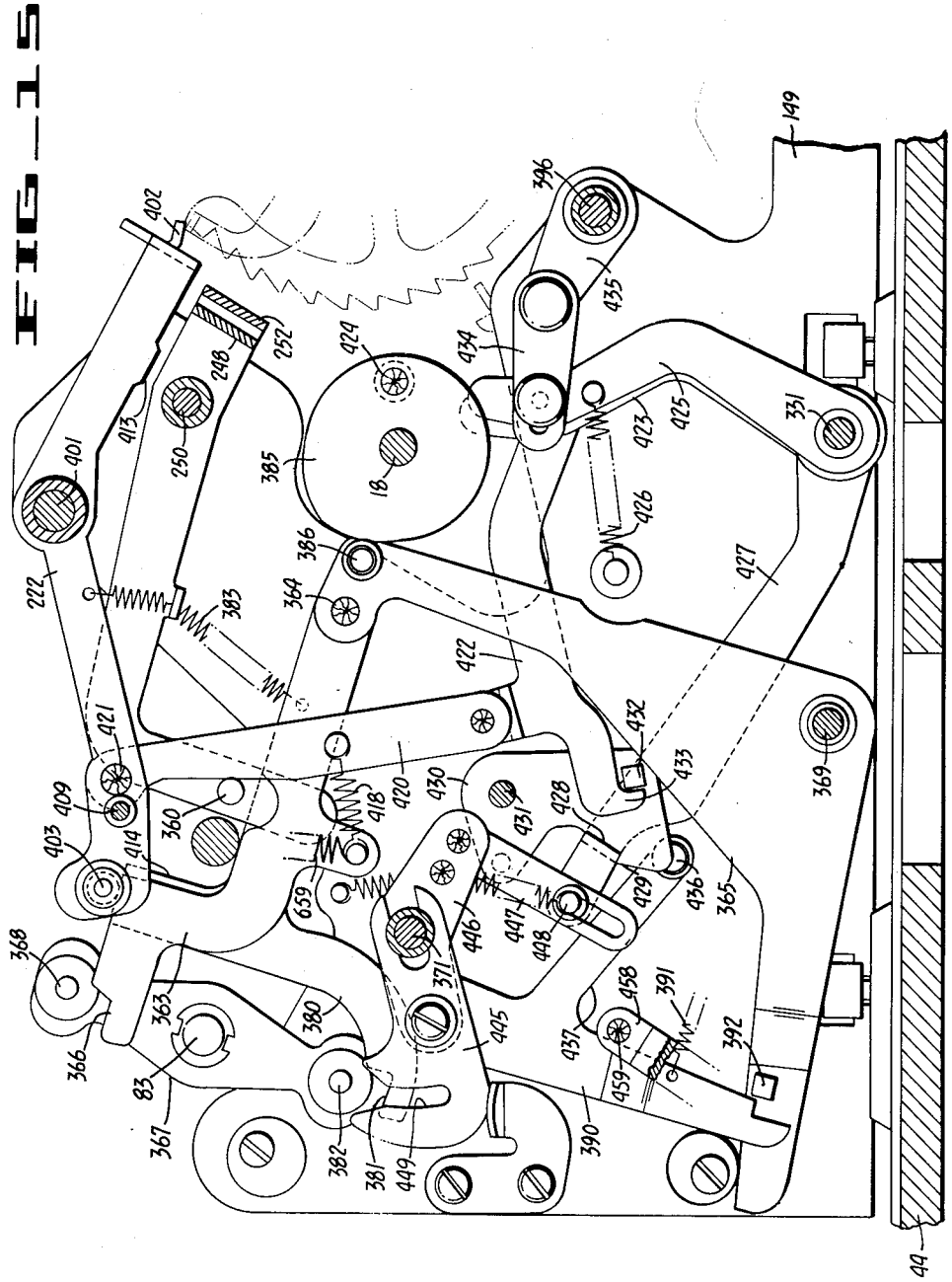

United States Patent Office 2,975,968
Patented Mar. 21, 1961

2,975,968

CALCULATING MACHINE

Grant C. Ellerbeck, San Leandro, Calif., assignor to Friden, Inc., a corporation of California Filed July 10, 1956, Ser. No. 596,889

4 Claims. (Cl. 235—63)

This invention relates to mechanical computing machines, and more particularly to a computing machine having a multiplication mechanism, a cycle counter register and means for selectively entering values from the multiplication mechanism directly into the cycle counter register.

It is among the objects of the invention to provide in a mechanical computing, or calculating, machine having a cycle counter, a counter actuator and manually settable means for enabling and disabling the counter actuator, mechanism for enabling the counter actuator under predetermined conditions when the manually settable means is set to disable the actuator; which mechanism is effective, under predetermined conditions, to enter a value from the multiplication keyboard of a calculating machine, such as the well-known Friden Calculating Machine, directly into the counter register of such a machine to enable an operator, while using the counter register as a grand total accumulator for products, or quotients, to add a value to, or subtract a value from, the value standing in the counter register; which mechanism acts automatically to enter a value from the multiplier keyboard into the counter register upon depression of a multiply key provided there is no value set in the full keyboard of the machine regardless of the fact that the manually settable multiplier nonentry key may be set in nonentry position; and which is of simple construction and can be applied to an existing calculating machine with no material modification of the machine construction.

Other objects and advantages will become apparent from a consideration of the following description and the appended claims in conjunction with the accompanying drawings which fragmentarily illustrate the well-known Friden computing or calculating machine and wherein:

Fig. 1 is a longitudinal cross-sectional view on a plane to the right of the right-hand frame side plate of the machine;

Fig. 2 is a fragmentary cross-sectional view on an enlarged scale of the digitating and registering mechanism of a calculating machine taken on a plane to the left of, and substantially parallel to, the plane of Fig. 1;

Fig. 3 is a fragmentary cross-sectional view on a plane indicated by the line 3—3 of Fig. 9 and shows the mechanism for rocking the counter actuator of the machine;

Fig. 4 is a fragmentary cross-sectional view substantially on a plane indicated by the line 4—4 of Fig. 9 and shows mechanism for blocking or disabling the counter actuator;

Fig. 5 is a fragmentary cross-sectional view on a plane indicated by the line 5—5 of Fig. 4;

Fig. 6 is a fragmentary cross-sectional view of the counter control mechanism taken on a plane to the right of, and substantially parallel to, the plane of Fig. 2;

Fig. 7 is a fragmentary cross-sectional view on a plane indicated by the line 7—7 of Fig. 6;

Fig. 8 is an elevational view of the counter actuator direction control mechanism at the right-hand side of the machine;

Fig. 9 is a fragmentary top plan view of the machine with parts of the cover broken away to show the multiplier mechanism below the broken away parts of the cover;

Fig. 10 is a fragmentary cross-sectional view of the multiplier value selection mechanism, taken on a plane indicated by the line 10—10 of Fig. 9;

Fig. 12 is a fragmentary plan view on a plane below the keyboard and indicated by the line 12—12 of Fig. 1;

Fig. 13 is a side elevational view of the left-hand side of the machine with the cover removed;

Fig. 14 is a fragmentary cross-sectional view of the multiplier control key mechanism shown in Fig. 13 and taken on a plane indicated by the line 14—14 of Fig. 9; and, Fig. 15 is a fragmentary cross-sectional view of the multiplier control mechanism taken on a plane indicated by the line 15—15 of Fig. 9.

Figure 11:
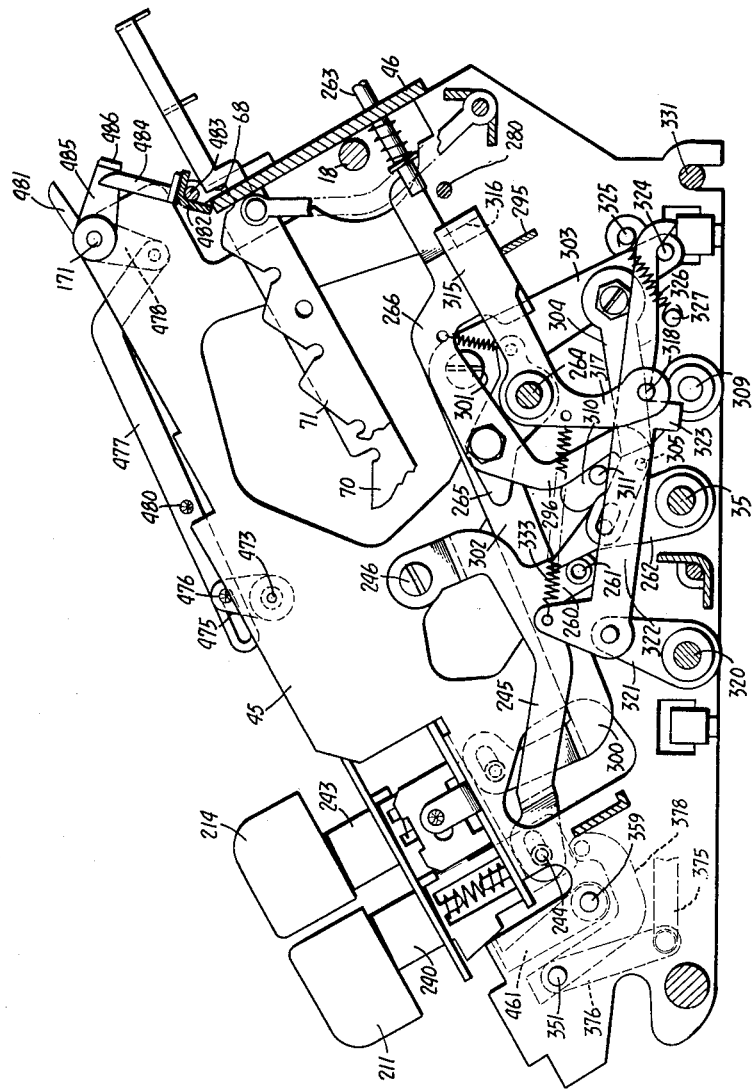
Fig. 11 is a fragmentary cross-sectional view of the multiplier control mechanism, taken on a plane indicated by the line 11—11 of Fig. 9.

With continued reference to the drawings and particularly to Fig. 1, a motor driven shaft 10 extends through, and is journalled in, the right-hand frame side plate 11 and carries a small drive gear 12. The gear 12 meshes with an idler gear 14 journalled on a stub axle 15 and the gear 14, in turn, meshes with the main clutch gear 16. The gear 16 is journalled on the main drive shaft 18 and has a hub formed to provide a clutch ratchet, not illustrated. A clutch disk 20 is secured to the main drive shaft 18 adjacent the ratchet hub of the gear 16. A clutch pawl 21 is pivotally mounted intermediate its length on the clutch disk 20 and has a tooth engageable with the clutch ratchet to drivingly connect the gear 16 to the shaft 18. The pawl 21 is resiliently urged into engagement with the clutch ratchet by a tension spring, not illustrated, and is held out of engagement with the clutch ratchet to disengage the cyclic clutch by a clutch control arm 22. The clutch control arm 22 is rockable about a fixed pivotal mounting 23 carried by the right-hand frame plate 11 to move the lower end of the control arm into, and out of, engagement with a shoulder on the clutch pawl 21 to engage and disengage the clutch.

For a more complete description of the cyclic clutch and the drive therefor, reference may be had to Patent No. 2,436,112, patented February 17, 1948 by A. B. Machado.

A control lever 25 is disposed forwardly of the control arm 22 and is rockably mounted intermediate its length on a fixed pivot 26 carried by the frame side plate 11. A link 27 connects the upper end of the lever 25 to the upper end of arm 22, so that rocking of the lever 25 rocks the arm 22. An elongated link 28 is connected at its forward end to the lower end of the control lever 25 and extends rearwardly of the machine to an operative connection with a motor controlling switch, not illustrated, to close the switch and energize the machine motor whenever the lever 25 is rocked to engage, or enable, the main clutch of the machine. A link 30 is connected to the upper end of the control lever 25 and extends forwardly from the control lever. Link 30 is supported at its front end by pin 31 received in a longitudinally extending slot in the link. A spring 32, connected between the link 30 and a fixed spring anchor 33, resiliently urges the link 30 forwardly and urges the control lever 25 to rock in a counter-clockwise direction, as viewed in Fig. 1, to move the control arm 22 into position to engage the pawl 21 and disable the clutch. A pin 34, extending from a cycle initiating control slide (not shown) operated by the addition and subtraction keys of the machine, engages in a notch in the link 30. Pin 34 is effective to move link 30 rearwardly to engage the clutch and energize the motor whenever the addition or the subtraction key is depressed, as is set forth in detail in Patent No. 2,714,986, patented August 9, 1955, by J. L. Moody et al.

A shaft 35 extends transversely of the machine adjacent the lower edge of the frame plate 11 and carries, near its right-hand end, an upwardly directed arm 36. The arm 36 carries a roller 37 which engages the lower end of a lever 38 pivotally mounted intermediate its length on a fixed pivotal support 40 carried by the frame plate 11. At its upper end, the lever 38 bears against the rearward side of the pin 41 which pivotally connects the lower end of the control lever 25 to the forward end of the switch operating link 28 so that, when the arm 36 is rocked rearwardly, or clockwise, as viewed in Fig. 1, the lever 38 is rocked counter-clockwise and rocks the control lever 25 in a direction to engage the main clutch of the machine and energize the machine motor. The shaft 35 is rocked in a clockwise direction, as viewed in Fig. 1, by the multiplication mechanism of the machine, as will be later described.

Referring now to Fig. 2, the machine has an intermediate frame side plate 149 spaced from, and substantially parallel to, the right-hand plate 11 and disposed at the left-hand side of the actuating mechanism, the side plates being supported on the machine base 44 (Fig. 10). Spaced-apart and substantially parallel mechanism supporting plates, or cross-bars, or cross plates, as indicated at 46, 47, 50 and 51, extend between, and are secured at their ends to, the frame side plates 11 and 149. An elongated bracket 48 is disposed rearwardly of, and mounted on, the cross-bar 47 and a similar bracket 49 is disposed rearwardly of, and mounted on, the bracket 48. The ends of the brackets 48 and 49 are not secured to the side plates of the frame.

There is also a control mechanism supporting plate, not illustrated, to the right of, and parallel to, the side plate 11, and a left-hand side plate 58 (Fig. 10) at the left-hand side of the machine. The main drive shaft 18 extends along the front side of the front cross plate 46 and is journalled on this plate. A series of actuator shafts 52 extend between the cross plates 46 and 48 and through the recessed lower portion of the cross plate 47 with their rotational axes substantially in a common plane and perpendicular to the rotational axis of the main drive shaft 18. In a ten bank calculating machine of the type disclosed in the Friden Patent No. 2,229,890, there are five regular actuator shafts, each carrying two stepped-drums, as indicated at 53 and 54. A sixth actuator shaft is disposed to the left of the regular actuator shafts for actuating the automatic division programming mechanism, as shown in Patent No. 2,327,981, issued August 31, 1943 to C. M. F. Friden.

The actuator shafts are journalled at their front ends in the front cross plate 46 and at their rear ends in the cross plate 48 and each carries at the rearward side of the cross plate 46 a beveled drive gear 55. A series of beveled gears 56 is mounted on the main drive shaft 18 and mesh respectively with the actuator shaft gears 55 to provide driving connections between the main drive shaft and the several actuator shafts.

A series of square shafts 60 is disposed above, and parallel to, the actuator shafts 52. These square shafts are journalled at their front ends in the cross plate 46, and are journalled at their rear ends in the rear cross plate 50 and intermediate their lengths in the intermediate cross plate 47. There will be ten square shafts for a machine having a ten order keyboard, with a square shaft disposed at each side of each of the regular actuating shafts 52. Each square shaft carries a pair of selection gears 61 and 62 engageable by a corresponding actuator drum 53 or 54. The selection gears 61 and 62 are nonrotatable on their respective square shafts by reason of the square shafts extending through squared apertures in the selection gear hubs but are slidable along the square shafts so that they may be differentially positioned relative to the corresponding actuator drums.

The full keyboard of the calculating machine comprises a series of ordinal rows of keys 63, each having a flat stem 64 mounted for vertical movement in a keyboard frame 65 and guided by suitable means, such as the rods 66 and 67 extending transversely of the interior of the frame 65 and through longitudinally extending slots in the key stems. A pair of selection slides 70 and 71 is disposed below each ordinal row of keyboard keys, each being mounted for longitudinal movement by suitable means, such as pivoted struts 72. Each slide 70 and 71 has on its upper edge a series of V-shaped notches provided with differentially inclined cam edges, as indicated at 73. Each key stem carries near its lower end a laterally projecting pin 74 engageable, when the key is depressed, with the adjacent slide cam 73 to shift the slide forwardly a differential amount corresponding to the digit value of the particular key depressed. The V-notches in the slides of each pair of slides 70 and 71 are so arranged that one slide is moved by the keyboard keys numbered "1" to "5," inclusive, and the other slide is moved by the keys of the same row numbered "6" to "9," inclusive. The slide 70 is connected to the selection gear 61 and the slide 71 is connected to the selection gear 62 on the corresponding square shaft 60. The sectors of the associated actuating drum 53 are so arranged that the selection gear 61 is differentially positioned relative to the drum sectors carrying from one to five teeth and the selection gear 62 is differentially positioned relative to the actuator drum sectors carrying from six to nine teeth.

The slides 70 and 71 extend rearwardly from the keyboard through individual notches in the upper portion of the frame cross-bar 46. Each slide is provided on its upper edge with a notch 68, preferably of rectangular shape, at the rearward side of this cross-bar. The notches 68 are all in alignment transversely of the keyboard when there is no entry value in the keyboard, for a purpose to be presently described.

Rearwardly of the cross plate 47, each square shaft carries a spool gear 75 which is slidably mounted on the square shaft but rotatable therewith by reason of the square shaft extending through a square, coaxial bore in the spool gear. Each spool gear has an intermediate portion of cylindrical shape and a bevel gear 76 or 77 disposed at each end of the intermediate portion and alternatively engageable with a coordinal dial driving gear 78 of the accumulator, or product register, of the machine. When the front gear 76 of a spool gear 75 is enmeshed with the coordinal dial driving gear 78, the product register is driven in a positive, or additive, direction. Conversely, when the rearward gear 77 of a spool gear is in mesh with the coordinal dial driving gear 78, the product register is driven in a negative, or subtractive, direction, as is well-known to the art. The position of the spool gears 75 relative to the coordinal dial driving gears 78 is controlled by an add-subtract gate 80 which comprises a bail having a flat intermediate, or strap portion, 81 extending below the intermediate portions of all of the spool gears 75 and disposed between the front and rear beveled gears 76 and 77 of the spool gears. Bail legs, as indicated at 82, extend one from each end of the strap 81 and are secured at their lower ends on a rockshaft 83. The gate 80 is effective to position the spool gears for additive or subtractive operation of the accumulator, or product register, or to position the spool gears in a centered, or neutral, position in which the front and rear gears of the spool gears are entirely clear of the dial driving gears 78, so that the product register can be shifted across the orders of the actuating mechanism without interference between the gears.

The accumulative, or product register, is mounted in a carriage which is ordinally shiftable transversely across the orders of the actuating and selection mechanism when the spool gears 75 are in centered position. The carriage comprises a hollow frame 85 of rectangular cross-sectional shape. The frame is supported at its rear side by a longitudinally extending ledge, or rib, 86 slidably mounted on the top surface of a rail 87 which is disposed in front of, and secured to, the upper portion of the rear frame cross plate 50. A front rail 88 is secured to the carriage frame 85 by suitable end plates (not shown) in spaced and parallel relationship to the front side of the frame 85. The rail 88 is supported for longitudinal movement on rollers 89 carried by the frame cross member 51. A cover 90 (partially shown in Fig. 2) is mounted on, and extends over, the upper and rear portions of the carriage. This cover 90 is provided with window openings 91 and 92 through which the accumulator register dials and the counter register dials are observed. A rack 93, having notches ordinally spaced-apart therealong, is mounted on the carriage frame in spaced and parallel relationship to the rear side of the frame for cooperating with the power-operated carriage shifting mechanism, as fully disclosed in Patent No. 2,313,817, patented March 16, 1943, by C. M. Friden and Patent No. 2,636,678, patented April 28, 1953, by M. P. Matthew.

The accumulator, or product register, comprises a series of ordinally spaced-apart dial shafts 95 extending through the carriage frame 85 in a vertical direction and journalled in the top and bottom thereof. Each dial shaft 95 carries the corresponding dial rotating gear 78 on its lower end, below the bottom surface of the carriage frame, and a tens-transfer cam 96, which is disposed between the gear 78 and the bottom surface of the frame 85. Within the frame 85, each shaft 95 carries a detent wheel 97 and a mutilated clearing gear 98. It also carries, immediately above the frame 85, a numbered dial 100. Clearing racks 105 extend longitudinally of the interior of the carriage frame 85 and, when moved to the right relative to the carriage frame, engage the mutilated clearing gears 98 to turn the dial shafts 95 to the "0" positions of the corresponding dials 100.

A tens-transfer mechanism is disposed between the frame cross-bar 47 and bracket 49 and comprises settable tens-transfer gears 107 slidably mounted, one on each square shaft 60. Each gear has an elongated hub 106 with the ten-tooth gear 107 at its front end and a pair of spaced-apart, annular flanges 108 at its rear end. Bellcrank levers 109 are disposed against the under side of the carriage frame 85 and are pivotally secured to the frame. Each of the levers 109 has a tail portion engageable with a corresponding tens-transfer cam 96 and a nose portion disposed between the flanges 108 of the tens-transfer gear 107 of the order next above the order of the transfer cam 96 with which the tail portion of the lever engages. With this arrangement, when a dial is rotated through its "9" to "0" position, the corresponding tens-transfer cam 96 rocks the associated bellcrank lever 109 to advance the tens-transfer gear 107 of the next higher order. The tens-transfer gears are detented in their advanced and retracted positions by individual detenting elements 110. When a gear 106 is advanced, the tooth portion 107, thereof is engaged before the end of the operating cycle by a single tooth 111 mounted on, and rotated by, a corresponding actuator shaft 52 to rotate the associated square shaft 60 through one unit space. The rotation of the advanced tens-transfer gear occurs immediately after the digitation interval of the particular order of the actuating mechanism. Before the end of the coincident cycle, the advanced transfer gears are all retracted by restore cams 112 which are mounted, one on each actuator shaft 52, and engage the detenting elements 110 to return the detenting elements and tens-transfer gears to the retracted positions of the gears.

A counter register is also carried by the machine carriage and comprises a series of ordinally spaced-apart dial shafts 115 journalled at their front ends in the carriage front rail 88 and at their rear ends in the front side of the carriage frame 85, with their rotational axes substantially perpendicular to the rotational axes of the co-ordinal dial shafts 95. Each counter register dial shaft 115 carries a numbered dial 116, a detenting wheel 117, a mutilated clearing gear 118 and a drive gear unit 119. Each drive gear unit 119 comprises a hub secured on the corresponding shaft 115, a ten-toothed gear 120 at one end of the hub and a disk, or flange 113 at the opposite end of the hub, which flange has therein a single notch rotationally related to the "0" indication on the corresponding dial 116. The clearing racks 114 extend along the front side of the carriage frame 85 and are supported on frame carried guides, or rollers 114'. When the racks 114 are moved to the right relative to the carriage frame, they engage the mutilated gears 118 and turn the counter register dials 116 to their "0" positions, as is well-known to the art.

The counter actuator is mounted on the stationary portion of the machine and extends immediately below the drive gears 119 of the counter register. This actuator comprises a shaft 122 which is reciprocated during each cycle of the machine by means of a cam 490 (Figs. 6, 7 and 12) mounted on the right-hand end of the main drive shaft 18, and a reversible cam follower, well-known to the art and described hereinafter in connection with Figs. 6, 7, and 8.

As shown in Fig. 3, the shaft 122 is rocked, or oscillated, during each machine cycle by a cam mechanism disposed at the lefthand end of the main drive shaft 18. This mechanism comprises a sector cam 123 mounted on the main drive shaft 18 and an arm 124 pivotally mounted at one end on a fixed pivot mounting 125 carried by the intermediate frame side plate 149 and having therein an aperture 126 of rectangular shape receiving the cam sector 123 so that this arm is rocked each time the main drive shaft 18 rotates. A bellcrank lever 127 is mounted at one end on the pivotal mounting 125 and is resiliently urged against a fixed stop 128 by a spring 129. An ear, or lug, 130 projects laterally from the bottom edge of the lever 127 and underlies the arm 124 so that the lever 127 is rocked away from the fixed stop 128 and then freed for return against the fixed stop by the spring 129 each time the shaft 18 rotates. An angular lever 131 is pivotally mounted at one end on the shaft 122 at the outer, or left-hand, side of the frame plate 149 and carries at its other end a pin 132 received in a notch, or open slot, 133 in the upper end of the lever 127. An arm 134 is secured to, and projects downwardly and rearwardly from, the shaft 122. A tension spring 135 connects the distal end of the arm 134 to a pin 136 mounted on the angular lever 131 at the angle of this lever. With this arrangement, when the lever 127 is rocked, it rocks the lever 131; and the spring 135 tends to rock the arm 134 and the shaft 122, when the lever 131 is rocked. However, if the shaft 122 is held against rocking movement, the spring 135 stretches so that the levers 127 and 131 can rock without rocking the shaft 122.

As shown in Figs. 6 and 7, the cam 490 for reciprocating the counter actuator is mounted on the main drive shaft 18 at the left-hand side of the right-hand frame side plate 11. This cam is a drum-type cam having therein two similar but angularly offset grooves 491 and 492, one of which is used for positive and the other of which is used for negative operation of the actuator. A sleeve 493 is positioned adjacent the cam 490 and is rockably mounted on a shaft 489 mounted in upper and lower brackets 494 and 495 carried by the side plate 11. Arms 496 and 497 project from the sleeve 493 to the cam 490, one above and one below the cam. At its end remote from the sleeve 493, the arm 496 carries a pin 498 engageable in the groove 491 of the cam; and the arm 497 carries, at its end removed from the sleeve 493, a pin 499 engageable in the cam groove 492. The pins 498 and 499 are alternatively and selectively engageable in the corresponding cam grooves as the sleeve 493 is moved upwardly or downwardly so that the operational direction of the counter actuator can be selected.

A shaft 500 is journalled in the control plate of the machine and is disposed substantially at right angles to the shaft 489. An arm 501 projecting forwardly from the shaft 500 carries a pin 502 engaged between spaced-apart annular flanges 503 and 504 on the sleeve 493. With this arrangement, rocking of shaft 500 will raise and lower the sleeve 493 to control the operational direction of the counter actuator.

The arm 496 is extended rearwardly beyond the shaft 493, as indicated at 505, and a pin 506 extends upwardly from the rear end of the arm extension 505. The pin 506 is engaged between a pair of annular flanges 507 on the counter actuator shaft 122 to cause the actuator to reciprocate as the cam 490 rotates.

As shown in Fig. 8, a disk, or plate, 510 is mounted on the right-hand end of shaft 500 and is provided with substantially diametrically opposed notches 511 and 512. A link 513 is pivotally connected at its rear end by a pivotal connection 509 to the rear end of the add-subtract gate control slide 515. The slide 515 is connected by a pivotal connection 514 to the upper end of an arm 516 which is mounted on, and extends upwardly from, the add-subtract gate rock shaft 83 near the right-hand end of this shaft. Through this connection, forward and rearward movement of the slide 515 controls the positioning of the gate in its subtractive, additive and neutral positions. At its forward end, the link 513 is provided with a yoke formation 517 carrying spaced-apart pins 518 and 519, respectively, which pins are alternatively engageable in the notches 511 and 512 in the disk 510. When the pin 518 is in the notch 511 of the disk 510, and the add-subtract gate is in its positive or additive position, the shaft 500 is rocked in a direction to move the sleeve 493 upwardly and engage the pin 499 in the cam groove 492. When the add-subtract gate is in its negative, or subtract, position, the sleeve 493 is moved downwardly to engage the pin 498 in the cam groove 491 for negative operation of the counter actuator.

The operation of the counter actuator, in response to positive or negative positioning of the arm 516, is reversible by means of a bellcrank lever 520 having one arm engaging under the pin 518 and its other arm connected by a link 521 to a manually controlled key. When the bellcrank lever 520 is rocked, in a counter-clockwise direction as viewed in Fig. 8, the pin 519 will be engaged in the notch 512 and the pin 518 will be disengaged from the notch 511, whereupon the operation of the counter actuator will be reversed. It is contemplated that, in using the multiplication mechanism to enter a value directly from the multiplier selection mechanism into the counter register, the manual controls will be set so that the pin 518 is engaged in the notch 511 of the disk 510 and the counter actuator will thus operate positively when the add-subtract gate is in its addition position and negatively when the add-subtract gate is in its subtract position.

As shown in Fig. 2 and as is well-known to the art, a series of sleeves 140 is freely mounted in end-to-end relationship on shaft 122. A pair of actuating fingers 141 and 142 extend upwardly from each sleeve, one at one end and the other at the other end of the corresponding sleeve. The finger 142 is secured at the right-hand end of the sleeve and the finger 141 is secured at the left-hand end thereof, but the right-hand, or lowest order, sleeve is only a half sleeve and carries a finger 141 at its left-hand end, but does not carry a finger 142. Arms, as indicated at 143, are secured on the shaft 122, one near each end of this shaft, and a rod 144 extends between, and is secured to, these arms in spaced and parallel relationship to the shaft 122, so that the rod is oscillated about the rotational axis of the shaft when the shaft is rocked. Tension springs 145 are connected one between each of the fingers 141 and the rod 144 so that the fingers 141 are pulled by these springs in a clockwise direction, as viewed in Fig. 2, when the rod 144 is rocked downwardly.

In the positive operation of the actuator, the shaft 122 is first rocked rearwardly, in a clockwise direction as viewed in Fig. 2, is then shifted axially to the left, is then rocked forwardly, in a counterclockwise direction, and subsequently shifted to the right. For negative operation, the shaft 122 is shifted to the left, then rocked clockwise, shifted to the right, and finally rocked counterclockwise. When the shaft 122 is rocked, the right-hand, or lowest order, finger 141 is engaged with the coordinal drive gear 120 and, when the shaft 122 is shifted axially, this finger imparts a unit space rotation to the gear 120, the dial shaft 115 and the dial 116. Above the lowest order of the actuator, the finger 141 is held out of engagement with the coordinal drive gear 120 by engagement of the finger 142 on the right-hand end of the same sleeve with the coordinal flange 113 of the adjacent lower order, unless this flange is in the "9" position of the associated dial 116 for addition or the "0" position for subtraction, in which event the notch in the flange permits the upper end of the finger 142 to pass through the flange. The flange engaged by the finger 142 on any one sleeve 140 will be in the register order next below the drive gear 120 engaged by the finger 141 on the same sleeve, so that a tens-transfer can occur only when the lower order flanges are in their transfer position. The mechanism here briefly described enables the counter actuator to accumulate "1's" in the order of the counter register in alignment with the lowest order of the actuator and to transfer "10's" to successively higher orders of the counter as the lower orders are turned through their "9" to "0" positions, as is fully explained in Patent No. 2,229,889, referred to above.

Referring now to Fig. 4, the left-hand arm 143 on the shaft 122 is provided with a downwardly projecting extension 150 having a laterally projecting ear 151 at its forward side to provide an abutment surface. An arm 152 is pivotally mounted at its forward end on a pivot screw 153, carried by a bracket 154 mounted on the frame cross-bar 46. This arm 152 has a rearward extension 155 which engages the ear 151 of the arm 143 and holds the shaft 122 against rocking when the arm 152 is in its raised position, as shown in Fig. 4. This blocks operation of the counter actuator. The arm 152 is resiliently urged to its raised position by a spring 156, connected between an ear on the bracket 154 and an ear on the arm 152, and is moved downwardly to release the counter actuator by a control slide 157.

The slide 157 is disposed against the inner, or right-hand, side of the left side frame 149 and is supported for vertical movement by studs 158 and 159 extending from the side plate 149 through corresponding longitudinally extending slots in the slide. The slide 157 is connected to the blocking arm 152 by a pin 160 which extends from the slide through a slot provided in the blocking arm near the rear end of this arm. The slide 157 is resiliently urged upwardly to raise the arm 152 to blocking position by a spring 161 connected between the stud 159 and a pin 162 projecting from the lower end of the slide below the stud 159. The slide 157 may be manually set to the blocking or unblocking position of the arm 152 by a key 165 (Fig. 9) mounted on a bar 166 which extends rearwardly from the auxiliary, or multiplier, keyboard 167. The key 165 is effective to shift the bar 166 forwardly and rearwardly between two operative positions, in either of which the bar is retained by a latch spring 168 (Fig. 10) which engages in one or the other of two spaced-apart notches in the portion of the bar 166 extending forwardly of the rear edge of the multiplier keyboard 167. At its rearward end, the bar 166 is pivotally connected to the upper end of an arm 170 of a bellcrank which is journalled on, and extends upwardly from, a supporting shaft 171 adjacent the inner side of the frame side plate 45. A second arm 172 of the bellcrank (Fig. 9) extends rearwardly from the shaft 171 and bears on a pin 173 projecting laterally from the upper end portion of the slide 157. With this arrangement, when the key 165 is moved forwardly the arm 172 is raised, freeing the springs 156 and 161 to raise the slide 157 and the blocking arm 152 to the actuator blocking position of the blocking arm. When key 165 is moved rearwardly, the arms 170 and 172 are rocked, clockwise as viewed in Fig. 4, forcing the slide 157 downwardly and moving the blocking lever 152 downwardly so that the lever extension 155 is out of engagement with the abutment surface 151 on the arm extension 150 and the counter actuator is unblocked, or enabled.

The machine is provided with automatic division mechanism, as fully disclosed in Patent No. 2,327,981, including a division control arm 175 (Fig. 1) mounted on a pivotal support 176 and spring-rocked about this support when division is tripped off in the manner set forth in Patent No. 2,327,981 referred to above. When the division control arm 175 is rocked, it rocks a shaft 177 (Fig. 4) extending transversely of the machine rearwardly of the frame cross-bar 46. A pair of similar arms 178 is secured to the shaft 177 and project forwardly therefrom adjacent the frame side plate 149, which arms carry at their forward ends similar pins 179, one pin underlying and the other pin overlying the rearward end of a lever 180 pivotally mounted intermediate its length on a pivot stud 181 carried by the frame plate 149. The forward end of the lever 180 rides on the pin 162 projecting from the lower end of the counter actuator control slide 157. Lever 180 is rocked in a counter-clockwise direction, as viewed in Fig. 4, when the shaft 177 is rocked in a clockwise direction, as viewed in this figure, by the division control lever 175. In the event that the control key 165 is set in its forward limiting position to block the counter actuator at the time division is tripped off, rocking of lever 180, as described above, will move the actuator control slide 157 downwardly, unblocking or enabling, the counter actuator automatically so that the counter will be operated during the division operation regardless of the setting of the key 165.

The machine is also provided with an automatic multiplication mechanism, as shown in Figs. 9, 10, 11, 12, 13, 14 and 15, which mechanism includes the auxiliary or multiplier, keyboard 167 (Fig. 9). This multiplier keyboard is a ten-key keyboard having a frame 185 fixedly mounted on the machine and supporting ten digit keys 186.

Each key 186 has a flat stem 187 (Fig. 10) slidably mounted for vertical movement in the keyboard frame 185. Each key stem bears at its lower end on the upper end of an individual bellcrank lever of a group of bellcrank levers 188 disposed below the keyboard frame 185. The bellcrank levers 188 are pivotally mounted on a shaft 189 and have their opposite ends shaped to provide finger portions 190 extending through a slot in a guide plate 191. The slot in the guide plate 191 extends along a plane disposed at right angles to the rotational axis of the main drive shaft 18. The finger portions 190 of the bellcrank levers 188 are arranged sequentially along the slot, with the finger of the bellcrank lever operated by the "1" key at the bottom end of the slot and the finger of the bellcrank operated by the "8" key at the upper end of the slot in the guide plate. A zero latch releasing arm 192 is pivotally mounted at one end on a fixed pivot 193 and is connected by a link 194 to a lever 195 which is operated by all of the keyboard keys 186 except the "0" key, so that the arm 192 is rocked whenever any one of the keyboard keys other than the "0" key, is depressed.

A pin box, or cage, 196 is disposed immediately above the plate 191 and mounted for translational movements transversely of the machine on the guide rails 197 and 198, which are secured at their ends to the frame side plates 45 and 58 of the machine in spaced and parallel relationship to each other and to the main drive shaft 18. A number of ordinarily arranged rows of pins 200 are slidably mounted in the pin cage 196. One row of the pins is always disposed in opposition to the ends of the finger portions 190 of the bellcrank levers 188, so that when any bellcrank lever 188 is rocked by depression of the associated keyboard key 186 to move the finger portion 190 thereof through the slot in the plate 191, the end of this finger portion will engage the corresponding pin 200 and move the pin from a retracted to a set, or projected, position.

A series of selection sectors 201 is rockably mounted on a shaft 202 supported in spaced and parallel relationship to the guide rails 197 and 198 by the end walls of the pin cage 196. Each of the selection sectors 201 includes a dial portion 203 and a rack portion 204. Each selection sector 201 is urged to turn about the shaft 202, in a clockwise direction as viewed in Fig. 10, by a spring 205 and is releasably held in "0" position against the force of the spring 205 by a "0" latch lever 206 engaging a nose formation 207 at the counter-clockwise end of the rack portion 204. The "0" latch levers 206 are rockably mounted on a common shaft 208 carried by the pin carriage 196. The "0" latch lever at the selection station is rocked to release the coordinal selection sector 201 when a keyboard key 186 is depressed, as described above.

When a sector is released from its zero latch, it will turn about shaft 202 until stopped by a set pin 200, except that when the "9" key is depressed the sector will turn until stopped by a fixed stop rod 209. The keyboard keys also operate an escapement mechanism 210 which releases the pin carriage for spring-urged movements of one ordinal step to the left each time a key 186 is depressed and released. Depression of the zero key does not release the sector at the setting station but operates the escapement mechanism to shift the shiftable selection unit one ordinal space to the left, as shown in Patent No. 2,371,752, patented March 20, 1945, by C. M. Friden.

The multiplier is set up in the selection sectors 201 by successive depression of keyboard keys 186, and the multiplying operation is initiated by depression of one of the multiplication control keys 211, 212 or 213. The selection mechanism may be cleared to erase an erroneous entry therefrom, or for other purposes, by depression of the multiplier clear key 214.

For a more detailed description of the multiplier setting, or "S" unit, as briefly described above, reference may be had to Patent No. 2,371,752, patented March 20, 1945, by C. M. Friden and to Patent Nos. 2,376,997 and 2,399,917, patented May 29, 1945, and May 7, 1946, respectively, by C. M. Friden et al.

When the multiplication operation is established by depression of any one of the multiplication control keys 211, 212 or 213, the selection sectors 201 which have been set to value indicating positions, by depression of the keyboard keys 186, are incrementally returned to "0" position and the carriage is successively stepped to the right as each selection sector is returned to its "0" position. Thus, at the end of the multiplication operation, all of the sectors 201 which have been set by the keyboard keys will have been returned to their "0" positions and the pin carriage with the sectors carried thereby will have been returned to its terminal right-hand, or home, position.

During the multiplying operation, the sectors 201 which have been set to the digits of a multiplier value, are successively returned to their "0" positions by a return pawl 215 which is pivotally mounted at one end on the forward end of a supporting arm, or lever, 217, the other end of which is mounted on a fixed pivotal support 218. An arm 219 is disposed beside the pawl arm 215 and is mounted on a shaft 396 (Fig. 15) journalled in the left-hand side plate 58. A bent-over ear 235 on the upper end of arm 219 serves as a holding pawl for the sectors 201 when arm 219 is rocked forwardly, in a counter-clockwise direction as viewed in Fig. 10, and bears against an extension 236 of the return pawl 215 to move the return pawl away from the sector racks when arm 219 is rocked rearwardly, clockwise as viewed in Fig. 10.

The holding pawl holds the sector at the readout station against advanced movement by the spring 205 as the sector is being returned to its "0" position by the return pawl 215, the return pawl being urged into engagement with the holding pawl 235 and the sector rack teeth by a spring 221. A link 220 is pivotally connected at one end to the arm 217 below the forward, or free, end of this arm, and at its other end, the link 220 is engaged with an eccentric cam on the main drive shaft 18, so that the arm 217 is rocked, and the pawl 215 reciprocated, once during each cycle while the machine is in operation. As a sector 201 is returned to its "0" position, the upper end of its rack portion 204 engages an abutment formation 402 on the forward end of a shift control lever 222 and rocks this lever, in a clockwise direction as viewed in Fig. 10.

A shaft 223 disposed at right angles to the shaft 18 and driven from the shaft 18 by meshing beveled gears 224 and 225, is used for the power return of the pin carriage to its right-hand, or full-cycle, position. A sleeve 226 is slidably mounted on the shaft 223 adjacent the lower guide rail 198 for the pin carriage, which sleeve rotates with shaft 223 and has an eccentric cam engaged in a pin carriage return pawl 227. The front end of the pawl 227 is provided with a tooth 228 which successively engages the teeth of a return rack 230 mounted on the pin carriage 196 immediately above the guide rail 198, and the opposite, or rear, end of the pawl 227 is provided with a slot receiving a fixed pin 231. The tooth 228 of the pawl 227 is normally below, and out of engagement with, the teeth of the rack 230, as shown in Fig. 10, but the sleeve 226 is provided with an annular groove 232 receiving a pin 233 carried by an arm 330, which is rocked when the arm 222 is rocked, to raise the sleeve 226 until the pawl tooth 228 is in position to engage the teeth of the rack 230. Thus, as each selection sector 201 is returned to its "0" position, the pawl 227 will step the pin carriage one ordinal step to the right and bring the sector in the next highest order into readout position in which the sector rack teeth are engaged by the return pawl 215.

As shown in Figs. 9, 11 and 13, the multiplier keys 211, 212 and 213 have flat key stems 240, 241 and 242, respectively, mounted for vertical movement on the keyboard frame 185, and the multiplier clearing key 214 has a similar flat key stem 243. A pin 244 projects laterally from the lower portion of the multiplier key stem 240 and engages in a slot in the front end of a lever 245, the rear end of which is mounted on a fixed pivot 246. A pin 247 projects laterally from the lower end portion of the stem 241 of the key 212 and is engaged in a slot in the front end of a lever 248 which is pivotally mounted toward the rear of the machine on a fixed shaft 250 (Fig. 13). A similar pin 251 projects from the lower end of the stem 242 of the key 213 and is engaged in a slot in the forward end of a lever 252 which is disposed beside, and to the right of, the lever 248 and also pivotally mounted on the fixed shaft 250. A lever 253 extends along the outer, or left-hand, side of the lever 248 and is pivotally mounted at its rear end on the shaft 250. At its front end this lever 253 carries a laterally projecting pin 254 (Fig. 9) which underlies both of the levers 248 and 252 so that the front end of the lever 253 is rocked downwardly whenever the key 213 or the key 212 is depressed.

The lever 253 has, intermediate its length, a downwardly extending arm 255 (Fig. 13), the lower end of which bears on a pin 256 projecting laterally from the upper end of an arm 257 secured on the left-hand end of the shaft 35. When the front end of the lever 253 is rocked downwardly, as described above, arm 257 and shaft 35 are rocked, counter-clockwise as viewed in Fig. 13, and this movement of shaft 35 engages the main clutch of the machine and energizes the machine motor, as was previously described in connection with Fig. 1.

Referring now to Fig. 11, the lever 245, which is rocked downwardly, or in a counter-clockwise direction as viewed in Fig. 11, when the multiplier key 211 is depressed, has a downwardly projecting extension 260 carrying a roller 261 near its lower end. The roller 261 bears against the upper portion of the forward side of an arm 262 which is secured on, and extends upwardly from, the shaft 35, so that the shaft 35 is rocked to enable the main clutch of the machine and energize the machine motor when the key 211 is depressed. As shown in Patent No. 2,399,917, referred to above, rocking of shaft 35 enables the left carriage shift mechanism of the machine and normally enables the power-operated register clearing mechanism. A portion of the power-operated register clearing mechanism is shown in Figs. 11 and 12 and includes the control rod 263 for the register clearing clutch 258 and register clearing cam mechanism 259. A shaft 264 extends transversely of the machine above, and parallel to, the shaft 35, and carries an arm 265 which is mounted on the left-hand end thereof. A pusher link 266 is pivotally connected at its forward end to the arm 265 and has its rearward end in engagement with the control rod 263 to force this rod rearwardly and enable the power-operated register clearing mechanism when the shaft 264 is rocked, clockwise as viewed in Fig. 11. Shaft 264 is rocked clockwise when shaft 35 is rocked by depression of a multiplier key by power-operated mechanism to be later described.

Referring to Fig. 12, a second arm 267 is mounted on, and extends upwardly from, the shaft 264 to the right of the arm 265, and a pusher link 268 is pivotally connected at its forward end to the upper end of the arm 267. At its rearward end, the link 268 is provided with a notch receiving a pin 269 projecting laterally from an arm 270 secured to the left-hand end of a sleeve 271 and projecting radially from the sleeve. The sleeve is rockably mounted on a shaft 272 extending transversely of the machine and carries at its right-hand end an arm 273 which also projects radially from the sleeve. An elongated pin 274 extends laterally to the right from the arm 273 and engages the forward end of the control rod 275 for the left shift clutch 279 of the machine.

Shaft 264 is rocked by a light key touch mechanism, fully disclosed in Patent No. 2,650,761, patented September 1, 1953 by A. B. Machado, and including an arm 276 secured to, and projecting upwardly from, the shaft 35 to the right of the arm 262. A link 277 extends rearwardly from the upper end of the arm 276 and is resiliently connected to the arm 276 by a spring 278. At its rearward end, the link 277 is connected to the actuator 229 of the power-driven, light key touch mechanism. The actuator 229 is mounted on an eccentric which is mounted on a shaft 280 near the right-hand end of this shaft. Shaft 280 is driven from the shaft 223 by a miter gear connection, not illustrated. The actuator 229 is rocked by the link 277 when the shaft 35 is rocked to bring a hook formation on the actuator into engagement with a pin 284 carried by an arm 285 mounted on the shaft 264.

The arrangement is such that when the shaft 35 is rocked to enable the light key touch drive mechanism, this mechanism rocks the shaft 264, and rocking of the shaft 264 acting through arm 267, pusher link 268, arms 270 and 273 and pin 274, shifts the clutch control rod 275 rearwardly to engage the carriage left shift clutch and, acting through arm 265 and pusher link 266, shifts the control rod 263 rearwardly to enable the power-operated return clear mechanism of the machine. Thus, the carriage will be returned to its limiting, left-hand position and the carriage registers automatically cleared. As is fully disclosed in Patent No. 2,650,761, the clearing operation takes place in the cycle in which the carriage reaches its terminal left-hand position, In the cycle immediately following that in which the clearing action is accomplished, the right-hand override pawl, not illustrated, carried by the carriage at the right-hand end of the shift rack 93, as shown in my prior Patent No. 2,634,053, patented April 7, 1953, for example, is rocked to force the override slide 286 (Fig. 12) downwardly. A release bail 290 extends along, and is rockably mounted on, the shaft 264 and this bail has, at its right-hand end, an arm 291 extending upwardly from the shaft 264. A bellcrank lever 292 is rockably mounted on shaft 83 and has one arm extending rearwardly from the shaft 83 and engaged by the override slide and another arm extending downwardly from the shaft 83. A link 294 is pivotally connected at its rear end to the downwardly extending arm of the bellcrank lever 292 and at its forward end to the upwardly extending bail arm 291, whereby the rocking of the bellcrank lever by downward movement of the slide 286 is effective to move the link 294 forwardly. At its left-hand end, the bail 290 has a rearwardly offset extension 295 which underlies the pusher links 266 and 268 and raises these links out of engagement with the control rod 265 and the pin 269, respectively, when the bail 290 is rocked by the forward movement of the link 294. The bail 290 thus terminates operation of the register clear mechanism and also the left shift mechanism in the cycle following the cycle in which the carriage is moved to its terminal left-hand position and cleared.

Rocking of lever 245 by depression of the multiply key 211 thus moves the carriage to its terminal left-hand position and initiates a register clearing operation.

Depression of the clearing key 214, for the multiplier selection mechanism, rocks a bellcrank lever 300, in a counter-clockwise direction as viewed in Fig. 11. The bellcrank lever 300 is pivotally mounted at its angle on a fixed pivotal support 301 and has one arm 302 extending between this pivotal support and the stem of the key 214, and a second arm 303 extending downwardly from the pivotal support. A link 304 connects the bellcrank lever arm 303 to the arm 262 extending upwardly from the shaft 35, so that the shaft 35 is rocked to cycle the machine when the multiplier clear key 214 is depressed. The pusher link 266 for the control rod 263 of the return clear mechanism, has a tail portion 296 terminating rearwardly of, and adjacent to, a pin 305 carried by the link 304, which pin engages the tail portion of the pusher link 266 and rocks the pusher link upwardly to inoperative position when the bellcrank lever 300 is rocked. This disables the clearing mechanism, so that the product and counter registers will not be cleared when the carriage is returned to its terminal left-hand position.

As shown in Figs. 11 and 12, a bellcrank lever 315 is pivotally mounted at its angle on the shaft 264 and has a perpendicularly directed ear 316 at its rear end underlying the rearward portion of the return clear pusher link 266. This lever has an arm 317 extending downwardly from the shaft 264 and carrying near its lower end a laterally projecting pin 318. A shaft 320 extends transversely of the machine below the multiplier selection mechanism. An arm 321 is secured on this shaft 320 at the right-hand side of the multiplier selection mechanism. A link 322 is pivotally connected at its forward end to the upper end of the arm 321 and has intermediate its length, a notch receiving the pin 318. At the forward side of the notch receiving the pin 318, the link 322 is provided with a downwardly projecting extension 323, the rearward edge of which restrains the link against moving rearwardly relative to the pin 318. At its rearward end, the link 322 rests on a pin 324 projecting from the lower end portion of the arm 303 of the bellcrank lever 300, so that the rear end of the link 322 is raised, against the urgency of a spring 333 connected between an upward projection of link 322 and the arm 317, to disengage the pin 318 from the notch in the link when the lever 300 is rocked. This frees the bellcrank lever 315 so that this lever can be rocked up by the portion 295 of the bail 290 at the end of the left shift operation without rocking shaft 320 and initiating multiplication, as will later appear. A pin 325 projects from the arm 330 (Fig. 10) and is disposed adjacent the rearward edge of the bellcrank lever arm 303 and the upper edge of the link. The arm 330 (Fig. 10) is mounted at one end on shaft 331 and carries at its other end the pin 233 engaged in the groove 232 in the sleeve 226. When the bellcrank lever 300 is rocked by depression of the multiplier clear key 214 the pin 325 is raised, rocking the lever 330 to raise the sleeve 226 to engage the tooth 228 of the pin carriage return pawl 227 with the teeth of the return rack 230 on the pin carriage, so that the multiplier selection mechanism will be returned to the right to its full-cycle, or home, position by depression of the clear key 214. A spring 326 is connected between the movable pin 325 and a fixed pin 327 disposed below the link 322 and biases the sleeve 226 downwardly to disengage the pawl teeth 228 from the return rack 230.

Upon movement of the pin carriage to its limiting right-hand position, a bail of which the "9" stop rod 209 constitutes the cross-member (Fig. 10) is operated to return all differentially set selection sectors 201 to their "0" position in which they are latched by the corresponding zero latch levers 206, as is well-known to the art.

Depression of either the accumulative or negative multiply keys 212 or 213 will rock shaft 35, as has been described above in connection with Figs. 9 and 13. Rocking of shaft 35 will establish a left-hand shift operation of the machine carriage and will normally clear the product register if the register clear mechanism is not disabled. It will be noted in Fig. 13 that lever 253 carries a laterally projecting pin 306 received in a yoke formation at the upper end of a link 307. At its lower end, the link 307 is pivotally connected to one end of an arm 308, the opposite end of which is secured on the left-hand end of a shaft 309, which extends transversely of the machine below the multiplier selection mechanism. When the lever 253 is rocked downwardly by depression of either of the keys 212 or 213, the arm 308 is rocked downwardly and rocks the shaft 309, in a counterclockwise direction as viewed in Fig. 13. As shown in Fig. 11, an arm 310 is secured to the right-hand end of the shaft 309 and projects upwardly from this shaft adjacent the tail portion 296 of the return clear pusher link 266. Arm 310 carries a laterally projecting pin 311 which engages the tail portion of the pusher link and rocks the pusher link, in a counter-clockwise direction as viewed in Fig. 11, to disengage the rear end of the pusher link from control rod 263 and thereby disable the return clear mechanism when either of the accumulative multiply keys 212 or 213 is depressed.

Since the multiply keys 211, 212 and 213 do not function to release link 322 from the pin 318, it follows that when the bellcrank lever 315 is rocked by the bail extension 295 against the force of spring 333 after the carriage has been returned to its terminal left-hand position, the shaft 320 is rocked to establish the multiplication operation in the following manner.

As shown in Fig. 13, a latch dog, or saddle member, 334 is mounted on the left-hand end of shaft 320 and is rocked, in a counter-clockwise direction as viewed in Fig.

13, against the force of a spring 314 when the shaft 320 is rocked by the bellcrank lever 315, as described above. A multiplication initiating lever 335 is pivotally mounted intermediate its length on a fixed pivot 336 and extends forwardly from the pivot past the saddle member 334. At the location of the saddle member the lever carries a pin 337 which normally rests in a notch in the upper end of the saddle member to hold the lever in a raised, inoperative position. A bellcrank lever 338 pivotally mounted at its angle on a fixed pivot 339 is engaged at its front end with the rear end of the lever 335 by a pin-and-slot connection 340. A spring 341 connected between the lever 338, rearwardly of the pivot 339, and a fixed connection, urges the lever 338 to rock in a counter-clockwise direction and the lever 335 to rock in a clockwise direction, as viewed in Fig. 13.

The multiplication initiating lever 335 is also releasably latched in inoperative position by a bellcrank lever 345 pivotally mounted at its angle on a fixed pivot 346 and having one arm extending upwardly from the pivot 346 and underlying a laterally extending ear 347 on the forward end of the lever 335. The lever 345 has a second arm extending forwardly from the pivot 346. A spring 348 connected to the forward end of this second arm resiliently urges the lever 345, in a counter-clockwise direction as viewed in Fig. 13, to maintain its upwardly extending arm under the ear 347 of the lever 335. A U-shaped lever 350 is secured at its intermediate portion on the left-hand end of a shaft 351 extending transversely of the forward portion of the multiplication selection mechanism. This lever has a lower arm 352 carrying a pin 353 which engages the upper edge of the forwardly extending arm of the bellcrank lever 345, and an upper arm 354 which is used for an interlock and to restore the lever 335 to its latched position at the end of the operation. It has been mentioned that when any of the keys 211, 212 or 213 are operated, the light key touch mechanism of Patent No. 2,650,761, briefly described above, is effective to rock shaft 264, clockwise if viewed from the right. Shaft 264 is connected to shaft 351 at the right side of the machine by a linkage shown in Figs. 7 and 9 of that patent, but not particularly described herein, whereby shaft 351 is rocked, counter-clockwise in Fig. 13, by the light key touch mechanism. Obviously, the rocking of shaft 351 rocks lever 350 in a counter-clockwise direction. This rocking of the lever 350 rocks the bellcrank lever 345 in a direction to release the ear 347 and free the multiplication initiating lever 335 for movement to an operative position as soon as the saddle 334 is rocked from under the pin 337. When shaft 320 is rocked, as explained above, when the carriage has been returned to its terminal left-hand position, the saddle member 334 is rocked from under the pin 337. Thus, depression of any one of the multiplication keys conditions the lever 335 for movement to its operative position by spring 341 by first releasing the bellcrank latch 345. Thereafter, the rocking of the latch dog, or saddle, member 334 when the carriage moves to its terminal left-hand position, frees the lever 335 for movement to its operative position.

A bellcrank shaped latch dog 657 is pivotally connected to the latch dog, or saddle, member 334 and cooperates with an arm 358 mounted on shaft 359 to prevent a repetition of the multiplication operation if a multiplication key is held down after this operation is completed but, as this mechanism is not important to the present disclosure, a detailed description thereof is omitted.

Manual depression of any selected one of the multiplier keys 211, 212 or 213 conditions the machine for a multiplication operation in accordance with the selection of the multiplier key. It has been mentioned that depression of key 212 rocks lever 248 to which it is connected by pin-and-slot connection 247, the lever rocking clockwise in Fig. 13. Near its rearward end, the lever 248 carries a pin 360 (Fig. 13) received in an opening in a lever 361 near the rear end of this lever. The lever 361 is pivotally mounted at its forward end on a fixed pivot 362 and is raised at its rear end when the lever 248 is rocked by depression of key 212. A bellcrank lever 365 is pivotally mounted at its angle on a shaft 369 and has arms extending upwardly and rearwardly, respectively, from this shaft, as shown in Fig. 15. A link 363 pivotally mounted at its forward end on a pivotal connection 364, carried at the upper end of the upwardly extending arm of the bellcrank lever 365 is provided at its rearward end with a notch formation 366. A crossbar 367 is mounted on the left-hand end of the add-subtract gate rockshaft 83 and this bar carries at its upper end a laterally projecting pin 368 to which the notched end of the lever 363 is opposed when the rearward end of this lever is raised. A spring 659 connects the lever 361 to the link 363, so that the notch 366 in the rear end of the lever 363 is raised into alignment with the pin 368 when the rear end of the lever 361 is raised by the key lever 248 upon depression of key 212, as explained above. With the rear end of the lever 363 aligned with the pin 368, a rearward movement of the link 363 will rock the crossbar 367 and the rockshaft 83 in a direction to condition the product register driving mechanism of the machine for positive or additive operation of the product register.

A bellcrank lever 370 (Fig. 13), pivotally mounted at its angle on a fixed pivot 371, has an arm 372 extending forwardly from the pivot 371, which arm is connected at its forward end to the lever 361 by a link 373. The lever 370 has a second arm 374 extending downwardly from the pivot 371. An elongated link 375 (Figs. 11 and 13) connects the lower end of the arm 374 to one leg of a bail 376 rockably mounted on the shaft 351 and having a second leg 378 disposed in the path of the key stem 240 of the key 211. Thus, depression of key 211 will rock the bail 376 and the bellcrank lever 374 to raise the rear end of the lever 361 and also align the rear end of link 363 with the pin 368 to condition the register actuating mechanism of the machine for positive operation.

The key lever 252, operated by the negative multiply key 213, is also pivoted on the shaft 250 and extends rearwardly of this shaft. A link, or arm, 380 complementary to the arm 363, is pivotally mounted at its forward end on the pivotal mounting 364 and has its rearward portion directed downwardly and provided with a notch formation 381 which is engageable with a pin 382 projecting laterally from the lower end of the crossbar 367. A tension spring 383 (Fig. 15) connects the portion of the lever 252 extending rearwardly of the pivot shaft 250 to the arm 380 so that when the negative multiply key 213 is depressed, the rearward end of the arm 380 is raised to bring its notched formation 381 into position to engage the pin 382. Under these conditions, when the arm 380 is moved rearwardly, the crossbar 367 and shaft 83 are rocked to move the add-subtract gate to its negative, or subtractive, position and thereby enable the actuating mechanism for the product register of the machine to drive the register in a subtractive direction.

An eccentric cam 385 is mounted on, and driven by, the main drive shaft 18 adjacent the upper end of actuating bellcrank lever 365. This cam is slidable along the shaft 18 and is normally positioned by spring means, not illustrated, so that it is out of alignment with a cam following roller 386 mounted on the upper end of the bellcrank lever 365. When the cam 385 is shifted to the right, however, it engages the roller 386 and, during the subsequent cycle of the machine, moves the upper end of lever 365 and the arms 363 and 380 rearwardly so that whichever of the arms 363 and 380 is in alignment with a corresponding pin on the crossbar 367 will rock this crossbar in the corresponding direction.

The cam 385 is moved into position to engage the roller 386 by means which will now be described, when the multiplication initiating lever 335 is released from the bellcrank latch lever 345 and the saddle member 334.

As shown in Fig. 13, a lever 387 is pivotally mounted intermediate its length on a pivotal support 388 for movement about a pivot axis disposed at right angles to the rotational axis of the shaft 18. The upper end of the lever 387 engages the left-hand side of the cam 385 and the lower end is provided with an inclined cam edge engaged by a roller 389 mounted on the rearward end of the multiplication initiating lever 335. When the lever 335 is rocked, in a clockwise direction as viewed in Fig. 13, by spring 341 when the saddle member 334 is moved from engagement with pin 337 during the overstroke after the carriage has been returned to its terminal left-hand position, lever 387 is rocked to move the cam 385 to the right into engagement with the cam following roller 386. Upon subsequent rotation of the cam, the upper end of the lever 365 and the arms 363 and 380 are moved rearwardly to connect the machine actuating mechanism to the product register, the positive or negative nature of the connection being determined by whether the link 363 engages the pin 368 or the link 380 engages the pin 382. When lever 365 is rocked by cam 385, a latch lever 390 (Fig. 15) is pulled by a spring 391 into latching engagement with a stud 392 on the rearward end of lever 365 to latch this lever in its rocked position.

When lever 335 is released from saddle 334 and rocked by spring 341, a link 393 (Fig. 13) connected at one end to the pin of the pin-and-slot connection 340, is moved upwardly. At its other, or upper end, the link 393 is connected by pin-and-slot connection 394 to the outer end of an arm 395 mounted on the left-hand end of the shaft 396. The arm 395 and shaft 396 are thus rocked in a clockwise direction, as viewed in Fig. 13, by the force of a spring 397 when the multiplication initiating lever 335 is rocked. The holding pawl arm 219 (Fig. 10) is secured on the right-hand end of shaft 396 and the shaft normally holds the holding pawl and the sector return pawl 215 out of engagement with the aligned sector rack 204 until the shaft 396 is permitted to rock by the link 393, as described above. When the shaft is rocked, multiplication control is established by feeding back the differentially set selection sector 201 in alignment with the returning pawl 215 and holding pawl 219.

The shift control lever 222 (Fig. 13) is pivotally mounted intermediate its length on a fixed pivot 401 positioned above the main drive shaft 18. This lever carries at its front end the abutment formation 402 which overlies the rack portion 204 of the selection sector 201 at the operative, or readout, station. Thus, when the sector is fully returned to its "0" position by operation of the pawls 215 and 219, the upper end of the rack engages the abutment formation 402 and rocks the lever 222, in a counter-clockwise direction as viewed in Fig. 13. At its rearward end, the lever 222 carries a pin 403 which overlies the upper edge of the arm 363 and an upwardly extending projection 414 (Fig. 15) on the arm 380, and rocks whichever one of these arms is raised to engage the corresponding pin 368 or 382 out of engagement with the pin, freeing the crossbar 367. The add-subtract gate is then returned to its neutral position by the conventional centering means and the machine is conditioned for a one-order right shift of the carriage.

A lever 404 (Fig. 13) is pivotally mounted intermediate its length on a fixed pivot 405 and pivotally connected at its front end to the rear end of the lever 338 by a pivotal connection 406. At its rear end, the lever 404 carries a pin 407 engaged in a slot in a link 408, the upper end of which link is provided with a notch receiving a pin 409 projecting from the lever 222 near the pin 403. A spring 410 connects a pin 411 on the rearward, lower end of the link 408 to a pin 412 on the rear end of the lever 404. With the above-described arrangement, when the lever 338 is rocked, counter-clockwise as viewed in Fig. 13, incident to the release of the multiplication initiating lever 335 from the saddle member 334, the rearward end of the lever 404 is moved toward the lever 222, tensioning spring 410 and applying an upward force to the rear end of the lever 222 which urges the front end of this lever downwardly toward the upper ends of the rack formations 204 on the selection sectors 201. When the front end of the lever 222 is raised by the return of the selector sector at the readout station to its "0" position, the spring 410 is stretched. Thus, whenever the lever 335 is rocked to operative position, the spring 410 urges the lever 222 to rock toward a limiting position in which an abutment formation 413 on the lever bears on the upper surface of the transverse shaft 250.

Referring to Fig. 15, a link 420 is pivotally connected at its upper end to the lever 222 by a pivotal connection 421 adjacent the pin 409 and is pivotally connected at its lower end to the rear end portion of a hook arm 422. The front end of the hook arm is pivotally connected to the upper portion of an arm 423, the lower end of which is rockably mounted on the shaft 331 and the hook arm is urged rearwardly by a spring 418. A pin 424 carried by the cam 385 engages the upper end portion of the arm 423 each time the cam rotates when the cam is shifted to the right to engage the roller 386, as explained above, so that the arm 423 is rocked back and forth during each cycle of the machine in multiplication, and the hook arm 422 is longitudinally reciprocated. A second arm 425 is disposed beside the arm 423, being rigidly secured at its lower end on the shaft 313. The upper end of this arm is positioned for engagement by the cam carried pin 424 but is normally latched out of engagement with the pin 424 against the force of a spring 426 connected to the arm 425, which urges the arm 425 and the shaft 331 to rock in a counterclockwise direction, as viewed in Fig. 15. An arm 427 is secured at one end on shaft 331 and extends upwardly and rearwardly from this shaft. Near its rearward end, this arm 427 is provided with a lateral offset 428 engaged by a tooth 429 of a latch dog 430 which normally latches the arm 425 out of engagement by the pin 424. The latch dog is pivotally mounted on a shaft 431 and is provided with a stud 432 projecting from the lower portion of the latch dog below the hook formaion 433 at the rear end of the hook arm 422.

When the rear end of the lever 222 is rocked down as the front end of this lever is forced up by the return of the selection sector in readout position to "0," the link 420 is moved downwardly, moving the hooked rear end of the arm 422 downwardly into engagement with the stud 432. During the latter portion of this cycle the cam carried pin 424 rocks the upper end of arm 423 forwardly, and the forward movement of the hook arm 422 disengages the latch dog tooth 429 from the lever 427. As soon as the pin 424 rocks the upper end of arm 423, releasing latch 429, spring 426 rocks the lever 427 downwardly and rocks the shaft 331, in a counter-clockwise direction as vewed in Fig. 15. This establishes a right shift cycle, as described below, and at the end of this cycle both levers 423 and 425 are restored by the pin 424 and lever 427 is relatched.

When arm 427 rocks downwardly, it strikes a stud 436 carried at the forward end of a forwardly projecting arm 437 on the latching lever 390, thereby rocking this lever to move the lower end thereof out of latching engagement with the square stud 392 on the bellcrank lever 365 and release this lever and the links 363 and 380. The conventional resilient centering means then moves the add-subtract gate 80 to the neutral, or centered, position of the gate.

A centering arm 445 for the add-subtract gate is rockably mounted on the shaft 371. It is connected by an arm 446, a link 447 and a spring-biased pin-and-slot connection 448 to the rear end of the arm 427, so that the rear end of the centering arm 445 is rocked upwardly when the rear end of arm 427 is rocked downwardly by the spring 426. The arm 445 is adjustably mounted on the arm 446 and is provided with a deep notch 449 which receives the lower pin 382 on the crossbar 367 to positively hold the add-subtract gate in its centered, or neutral, position while the right-hand shift of the carriage is taking place, as described below.

The upper portion of the arm 425 is connected by a link 434 with an arm 435 on the shaft 396, so that the rearward movement of arm 425 when arm 427 is unlatched, rocks the pawls 215 and 219 out of engagement with the rack teeth of the selection sector 201 in readout position. The arm 330 (Fig. 19), which raises and lowers the backspacing, or pin carriage return, pawl sleeve 226, is mounted on shaft 331. Thus, the rocking of this shaft by downward rocking of arm 427, when this arm is released from the latch dog 430, raises sleeve 226 to bring the pin carriage return pawl 227 into engagement with the return rack 230 on the pin carriage. Therefore, in the next cycle, the shiftable selection unit of the multiplier selection mechanism is returned one order to the right to bring the next higher order selection sector to readout position.

As shown in Fig. 12, an arm 440 is slidably mounted on shaft 331 to the right of the control rod 444 for the carriage right shift clutch 450 and adjacent an arm 442 rigidly mounted on shaft 331. The shaft 331 is rotatable in the hub of the arm 440 but arm 442 carries a pin 441 which extends to the right from arm 442 and through an aperture in arm 440 so that arm 440 is constrained to rock with arm 442 and shaft 331. Arm 440 is urged to the left by a spring 451, but is held by a slide 452 out of position to operate the right shift bar 444, except when the pin carriage 196 is spaced more than one step to the left from its home piston. The slide 452 extends along the shaft 331 from the right-hand side of the pin carriage 196 to the arm 440 and disables the right shift setting action of this arm when the pin carriage is spaced not more than one step to the left from its right-hand, home position. An arm 453 depends from the shaft 272 and carries a laterally projecting pin 454 opposed to the front end of the control rod 444. Arm 440 is extended upwardly and rearwardly past the front side of pin 454 and when the arm 440 is shifted to the left by spring 451 and rocked rearwardly, as described above, it engages this pin and moves the pin and the control rid 444 rearwardly to engage the right shift clutch 450. This clutch is automatically disengaged at the end of a single cycle when the arm 427 is relatched by the latch dog 430.

During the right shift of the pin carriage of the multiplier unit, lever 222 is released from control by the selection sector 201 which caused its operation for that sector has shifted to the right of the lever, so that the front end of this lever can rock downwardly and raise the link 420 and the hook arm 422. Engagement of pin 424 with the upper end of arm 423 raises and relatches arm 427 and rocks the centering arm 445 out of engagement with the pin 382. The cam 385 then shifts links 363 and 380 rearwardly and, these arms now being released from the downward pressure of the pin 403, reengage the corresponding pin 368 or 382, depending upon which of the arms 363 or 380 has been activated by depression of a multiply key. The machine then proceeds to read out the value set in the next higher order selection sector 201.

A bellcrank lever 455 (Fig. 13) is mounted at its angle on a pivot 456 carried by the left-hand frame side plate 58 at the rear end of this plate and has one arm connected to the arm 404 by a link 457. The other arm 458 of this bellcrank extends upwardly and to the right and carries at its upper end a pin 459 positioned to engage the forward edge of the latch lever 390 when the bellcrank 455 is rocked counter-clockwise, as viewed in Fig. 13. Since rocking of arm 404 is controlled by the rocking of the multiplication initiating arm 335, when arm 335 is tripped at the beginning of a multiplication operation, bellcrank lever 455 is rocked, in a clockwise direction as viewed in Fig. 13, to move the pin 459 away from the latch lever 390 and free this lever for latching engagement with the stud 392 on the actuating lever 365. Later, when lever 335 is restored to its original position at the end of a multiplication operation, bellcrank lever 455 is rocked, in a counter-clockwise direction as viewed in Fig. 13, to release the latch lever 390 from the stud and hold the latch lever against accidentally latching the bellcrank lever 365 in operational position while the multiplication initiating lever 335 is in its raised, or inoperative, position.

The multiplication control keys are latched down in depressed or actuated condition by latch dogs 460 and 461 (Figs. 10 and 14), both mounted on the shaft 359 on which the arm 358 is mounted. The latch dog 460 has a tail portion 462 extending downwardly from the shaft 359, as shown in Fig. 14. A bellcrank lever 463 (Fig. 10) is pivotally mounted at its angle on the base plate 44 of the machine by a pivotal mounting 464 and strongly biased to rotate, counter-clockwise if viewed from above, by a spring, not shown. It has a rearwardly directed arm, the rear end 465 of which is directed upwardly and bears against the right-hand side of the pin cage 196 of the multiplier selection mechanism. The other arm 466 (Fig. 14) of this bellcrank bears against the downwardly extending tail portion 462 of the latch dog 460 and, when the pin carriage is restored to its right-hand, or full-cycle, position, the lever 463 rocks the latch dog 460 and the shaft 359 in a clockwise direction, as viewed in Fig. 14. This clockwise rocking of the shaft 359 releases the depressed multiplier key from the hold-down latch 460 or 461 and raises the arm 358. The rearward end portion of this arm engages under the pin 337 on the lever 335 and raises this lever to its original position. The saddle member 334 then engages under the pin 337 and the bellcrank 345 engages under the ear 347 at the forward end of the lever 335 to latch this multiplication initiating lever in its inoperative position at the end of the multiplying operation. Since rocking of the latch dogs 460 and 461 also releases the depressed multiplication key, as described above, the entire multiplication mechanism is automatically restored to its original condition when the multiplication operation has been completed by the restoration of the highest order selection sector 201 to its "0" position and the return of the pin carriage 196 to its normal, right-hand, position.

If the counter actuator shaft 122 is operative during the multiplication operation, the multiplier factor entered into the multiplier selection unit will be entered into the counter register as the machine cycles. As the register carriage is shifted during this operation, the counter register shifts with respect to the actuator, so that the value set up in successive orders of the multiplier selection unit is set up in corresponding orders of the counter register. However, if the multiplier nonentry key 165 is set in position to block operation of the counter actuator, it would not be possible to enter the multiplier into the counter register through the multiplication mechanism as described above. Since there are certain calculating operations in which it is desirable to operate the multiplier mechanism with the multiplier nonentry key in blocking position and to still be able to selectively enter a value from the multiplication mechanism into the counter register, the present invention provides mechanism for automatically enabling the counter actuator even though the multiplier nonentry key 165 is set in actuator blocking position, provided there is no entry value in the main, or full, keyboard of the machine.

Referring to Fig. 13, an elongated arm 470 is mounted at its lower end on the shaft 35 in conjunction with the arm 257 so that the two arms 257 and 470 constitute a V-shaped lever. At its upper end, the arm 470 bears against a pin 471 projecting from the lower end of an arm 472, the upper end of which is mounted on the left-hand end of a shaft 473 extending through the frame of the multiplier selection mechanism just rearwardly of the selection keys 186 of this mechanism. When one of the multiplication keys 211, 212 or 213 is depressed, the arm 470 is rocked, in a counter-clockwise direction as viewed in Fig. 13, and the arm 472 is rocked in a clockwise direction against the force of a tension spring 474 which tends to rock the arm 472 and shaft 473 to the normal, or inoperative, position of the shaft.

As shown in Figs. 9 and 11, the shaft 473 carries near its right-hand end, a second arm 475 extending upwardly from the shaft and carrying near its upper end a pin 476 which extends through a slot in a link 477. At its rearward end, the link 477 is pivotally connected to the lower end of an arm 478 secured on, and extending downwardly from, the shaft 171. A tension spring 479 connects the pin 476 to a pin 480 projecting from the link 477 rearwardly of the pin 476, so that, when the shaft 473 is rocked, clockwise as viewed in Fig. 13, the link 477 is urged forwardly by the force of the spring 479 and tends to rock the shaft 171, in a clockwise direction as viewed in Fig. 11. An arm 481 is fixed on shaft 171 to the right of, and adjacent, the arm 170 (Fig. 4). Arm 481 overlies the pin 173 on the control slide 157 for the counter actuator blocking lever 152 and is effective to force the slide 157 downwardly and enable the counter actuator when the shaft 171 is rotated, in a clockwise direction as viewed in Fig. 11. Rocking of shaft 171 by link 477 is controlled by a mechanism which senses a condition of the entry of nonentry of a value in the main, or full, keyboard of the machine.

A bail 482 of angular cross-sectional shape (Figs. 2 and 11) extends transversely across the upper edges of the selection slides 70 and 71 of the full keyboard adjacent the upper edge of the transverse frame member 46. This bail is mounted at its angle on a shaft 483 which is journalled at its ends in the frame side plates of the machine. If all of the selection slides 70 and 71 are in "0" position, the notches 68 in the upper edges of these slides will be in alignment transversely of the full keyboard adjacent the upper edge of the frame cross-member 46. If now the bail 482 is urged to rock, in a counter-clockwise direction as viewed in Fig. 11, the forward leg of the bail will enter the notches 68 in the selection slides and the bail will be free to rock through a limited angular movement. However, if one or more of the selection slides is shifted forwardly, as would be the case if there is an entry value in the full keyboard, the forward leg of the bail 482 would engage the upper edge, or edges, of the slide, or slides, so shifted and rocking movement of the bail would be precluded. The bail 482 thus senses the condition of the entry or nonentry of a value in the main, or full, keyboard of the machine.

An arm 484 extends upwardly and rearwardly from the left-hand end of the bail 482 and an arm 485 is secured on the shaft 171 and extends downwardly and rearwardly from the shaft 171 adjacent the arm 484. An ear, or cam, 486 extends laterally from the rear, or distal, end of the arm 485 and bears against the rear edge of the arm 484, so that the shaft 171 cannot be rocked, in a clockwise direction, as viewed in Fig. 11, unless the bail 482 is free to rock. If the shaft 473 is rocked while the shaft 171 is held against movement, movement of the pin 476 by the arm 475 stretches the spring 479 without moving the link 477. However, if the bail 482 is free to rock, the force of spring 479 will rock the shaft 171 and arm 481 to move the slide 157 to unblock the counter actuating mechanism. Thus, if a value is entered in the selection mechanism of the multiplier unit and one of the multiplier keys is depressed while there is no entry value in the main keyboard of the machine, the value so entered in the multiplier selection mechanism will be transmitted into the counter register of the machine regardless of the position of the multiplier nonentry key 165. If, however, there is an entry value in the full keyboard, the sensing bail 482 will preclude removal of the block from the counter actuator and the multiplier value will not be entered in the counter register.

When the multiplier selection mechanism is used to enter a value into the counter register, as described above, depression of the multiply key or the accumulative multiply key will enter the value from the multiplier selection mechanism positively, or additively, into the counter register if the register drive is set in its positive or additive condition; while depression of the negative multiplier key will enter the selected value negatively, or subtractively, into the counter register. There are thus two controls available for the positive or negative entry of the value from the multiplier mechanism into the counter register and it is necessary to make sure that the setting of the actuator drive reversing mechanism, previously described, is not such as to defeat the selection of the positive or negative multiply key in entering the value from the multiply selection mechanism into the counter register.

I claim:

1. In a cyclically operated calculating machine having a full keyboard including ordinally arranged differentially settable selection bars normally registering a "0" value an auxiliary multiplier keyboard, a counter register, a counter actuator, multiplying mechanism including multiplier control keys effective to initiate operation of the machine through a number of cycles corresponding to the value entered into the auxiliary keyboard whereby a value will be entered into said counter register by said counter actuator equal to that inserted into said auxiliary keyboard, and a manually settable multiplier nonentry mechanism effective when in nonentry position to disable operation of said counter actuator and thereby normally preclude the entry of an auxiliary keyboard value into said counter register, the combination which comprises a slot in each of said selection bars, said slots being aligned when the respective bars stand in a "0" value position, a sensing bail adapted to engage in said aligned slots, a yieldable mechanism operated by any of said multiplier control keys for operating said bail, enabling means for enabling said counter actuator regardless of the setting of said nonentry mechanism, and means operated by said sensing bail for operating said enabling means.

2. In a cyclically operable calculating machine having a multiplicand keyboard containing a series of ordinally arranged rows of value keys and a series of cooperating ordinally arranged selection bars differentially positioned from a "0" position by the keys of the respective row of keys, a multiplier keyboard, a counter register, a counter actuator, a positionable counter actuator enabling means normally biased to a disabling position, a counter entry control key operative to move said enabling means to an enabling position, multiplying mechanism effective to initiate operation of the machine through a number of cycles corresponding to the value entered into the multiplier keyboard whereby a value equal to that inserted into said multiplier keyboard would normally be entered or not entered into said counter register by said counter actuator in accordance with the positioning of said counter actuator enabling means, and control means for said multiplying mechanism, the combination which comprises a sensing bail extending transversely of said selection bars, means yieldably operated by said multiplier control means for operating said sensing bail, projections on said selection bars aligned when all of said bars register a value of "0" and so positioned as to enable operation of said bail whenever all of said bars register "0" and to block such operation whenever any one of said bars registers a value other than "0," and means operated by movement of said sensing bail to move said enabling means to its enabling position.

3. In a cyclically operated calculating machine having a full keyboard and selection bars differentially positioned thereby from a normal "0" position, an auxiliary keyboard, a counter register, a counter actuator, multiplying mechanism effective when actuated to operate the machine through a number of cycles corresponding to the value entered into the auxiliary keyboard whereby the counter actuator will insert a like value into said counter register, and a manually settable nonentry key effective when in nonentry position to block operation of said counter actuator and thereby normally preclude the entry of a value into said counter register, the combination which comprises automatic sensing mechanism operated by said multiplying mechanism and effective to sense a no-entry-value condition in said selection bars, enabling means for enabling said counter actuator regardless of the setting of said nonentry key, and means operated by said sensing means to operate said enabling means and thereby re-enable said counter actuator when said no-entry-value is sensed and said multiplying mechanism is operated, said automatic mechanism comprising a sensing bail extending transversely of said selection bars, means carried by said bars for engaging said bail whenever the selection bar registers a value position other than "0," and resiliently biased means moved when said multiplying mechanism is actuated to rock said bail to sensing position and enable said counter actuator if said bail fails to engage the means carried by the selection bars.

4. In a cyclically operable calculating machine having a full keyboard including differentially settable selection bars normally registering no-value, an auxiliary keyboard, a counter register, a counter actuator, multiplying mechanism effective to operate the machine through a number of cycles corresponding to the value entered into the auxiliary keyboard whereby the counter actuator will insert a like value into said counter register, manually operated control means for said multiplying mechanism, and a manually settable nonentry key effective when in nonentry position to disable operation of said counter actuator and thereby normally preclude the entry of a multiplier value into said counter register, the combination comprising a sensing bail extending transversely of said full keyboard and operative to sense a no-value or a value condition of said selection bars, resilient means operated by said control means to bias said bail to a sensing position, enabling means for enabling said actuator regardless of the setting of said nonentry key in a nonentry position, and means operated by said bail when sensing a no-value condition of said selection bars for operating said enabling means.

References Cited in the file of this patent

UNITED STATES PATENTS

| | | |
|---|---|---|
| 2,362,633 | Hilder | Nov. 14, 1944 |
| 2,366,345 | Machado | Jan. 2, 1945 |
| 2,678,161 | Fleming | May 11, 1954 |
| 2,714,989 | Ellerbeck | Aug. 9, 1955 |

UNITED STATES PATENT OFFICE
CERTIFICATION OF CORRECTION

Patent No. 2,975,968            March 21, 1961

Grant C. Ellerbeck

It is hereby certified that error appears in the above numbered patent requiring correction and that the said Letters Patent should read as corrected below.

Column 5, line 64, after "107" strike out the comma; column 9, line 47, after "automatically" insert a comma; column 10, line 10, for "ordinarily" read -- ordinally --; column 11, line 23, after "and" insert a comma; column 13, line 12, for "position," read -- position. --; column 18, line 31, for "313" read -- 331 --; line 58, for "vewed" read -- viewed --; column 19, line 14, for "(Fig. 19)" read -- (Fig. 10) --; line 36, for "piston" read -- position --; line 47, for "rid" read -- rod --; column 21, line 36, for "of nonentry" read -- or nonentry --; column 22, line 30, after "value" insert a comma.

Signed and sealed this 22nd day of August 1961.

(SEAL)
Attest:

ERNEST W. SWIDER
Attesting Officer

DAVID L. LADD
Commissioner of Patents